United States Patent
Patil et al.

(10) Patent No.: US 12,541,705 B2
(45) Date of Patent: Feb. 3, 2026

(54) SYSTEM AND METHOD FOR FACILITATING A MACHINE LEARNING MODEL REBUILD

(71) Applicant: Capital One Services, LLC, McLean, VA (US)

(72) Inventors: Aditya Patil, McLean, VA (US); Chase Hudson, McLean, VA (US); Ryan Tine, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 1482 days.

(21) Appl. No.: 17/089,645

(22) Filed: Nov. 4, 2020

(65) Prior Publication Data

US 2022/0138621 A1    May 5, 2022

(51) Int. Cl.
*G06N 20/00*        (2019.01)

(52) U.S. Cl.
CPC ................... *G06N 20/00* (2019.01)

(58) Field of Classification Search
CPC ....................................................... G06N 20/00
USPC ............................................................ 706/11
See application file for complete search history.

(56) References Cited

U.S. PATENT DOCUMENTS

| | | | | |
|---|---|---|---|---|
| 8,595,154 B2* | 11/2013 | Breckenridge | ........ | G06N 20/00 706/12 |
| 2018/0018585 A1* | 1/2018 | Marin | ..................... | G06N 20/00 |
| 2018/0285772 A1* | 10/2018 | Gopalan | .................. | G06N 7/01 |
| 2018/0300576 A1* | 10/2018 | Dalyac | ..................... | G06F 18/23 |
| 2019/0163666 A1* | 5/2019 | Cakmak | .................. | G06N 5/02 |
| 2019/0340518 A1* | 11/2019 | Merrill | ..................... | G06F 40/56 |
| 2021/0117868 A1* | 4/2021 | Sriharsha | ............... | G06N 20/20 |

* cited by examiner

*Primary Examiner* — Omar F Fernandez Rivas
*Assistant Examiner* — Em N Trieu
(74) *Attorney, Agent, or Firm* — Foley & Lardner LLP

(57) ABSTRACT

Some embodiments of the present application include obtaining a trained machine learning model that was trained using training data. Production data may be obtained from a data feed selected based on the trained machine learning model. In some embodiments, feature sets and observed results may be extracted from data output from the data feed, and one or more features or results may be masked to generate the production data. Predicted results data may be generated with the trained machine learning model based on the production data and an accuracy score for the trained machine learning model may be determined based on the predicted results data. If the accuracy score satisfies a threshold accuracy condition, the trained machine learning model may be caused to be rebuilt or the training data may be caused to be updated.

18 Claims, 11 Drawing Sheets

SYSTEM AND METHOD FOR FACILITATING A MACHINE LEARNING MODEL REBUILD

FIELD

Some embodiments disclosed herein relate to facilitating a machine learning model rebuild, including, for example, determining how accurate a machine learning model is with respect to production data, as well as whether the production data includes similar features as training data used to train the machine learning model.

BACKGROUND

Machine learning models are trained using training data. The accuracy of the machine learning model after training is determined using validation data (also referred to as "test data"). The training data may be cultivated from data previously input to instances of the model, various repositories (e.g., ImageNet for object recognition models, MNIST for character recognition models, etc.), or from other sources. In some cases, the machine learning model may be rebuilt or retrained periodically. However, challenges exist in determining when the training data needs to be updated and/or when the machine learning model needs to be rebuilt based on the data being input to the machine learning model. Thus, there is a need for systems and methods for effectively monitoring data being input to the machine learning model and the output accuracy of the machine learning model to determine when to rebuild a machine learning model, as well as, or alternatively, when to update training data used to train a machine learning model.

SUMMARY

In some embodiments, a trained machine learning model may be obtained, and production data may be obtained from a data feed selected based on the trained machine learning model. Some embodiments include determining a stability score for the trained machine learning model based on training data used to train the machine learning model and the production data to be provided as input to the trained machine learning model. Some embodiments include generating, with the trained machine learning model, predicted results data based on the production data, and computing an accuracy score for the trained machine learning model based on the predicted results data. In response to determining that the accuracy score satisfies a threshold accuracy condition, as well as, or alternatively, in response to determining that the stability score satisfies a threshold stability condition, the trained machine learning model may be caused to be rebuilt or the training data may be caused to be updated.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

In the following description, for the purposes of explanation, numerous specific examples are set forth in order to provide a thorough understanding of example embodiments. It will be appreciated, however, by those having skill in the art that embodiments may be practiced without these specific details or with an equivalent arrangement.

Figure 1:
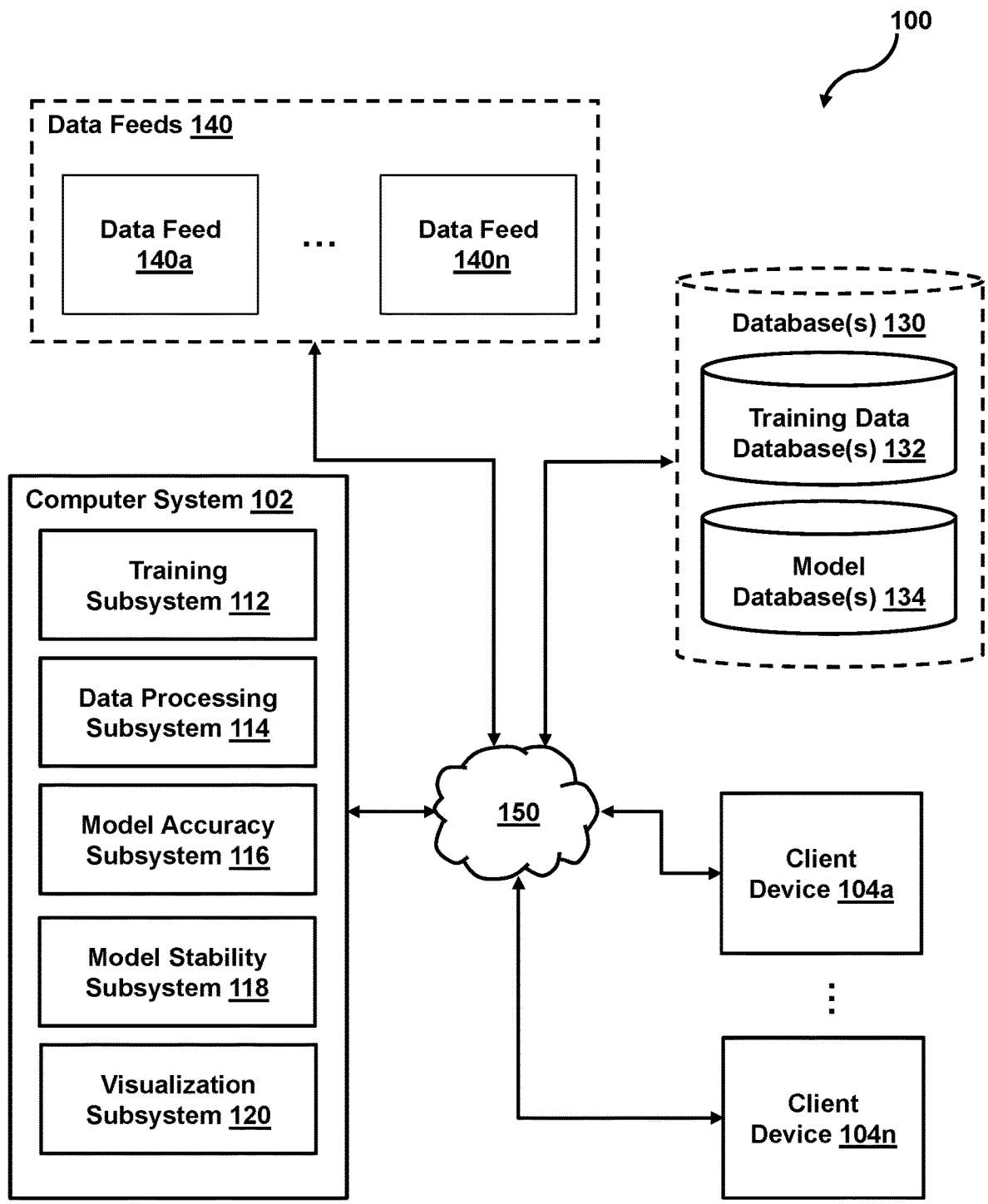
FIG. 1 shows a system for facilitating a machine learning model rebuild, in accordance with one or more embodiments.

FIG. 1 shows a system 100 for facilitating a machine learning model rebuild, in accordance with one or more embodiments. As shown in FIG. 1, system 100 may include computer system 102, client devices 104a-104n, which collectively may be referred to as "client devices 104" and may individually be referred to as "client device 104," data feeds 140, databases 130, or other components. Computer system 102 may include training subsystem 112, a data processing subsystem 114, a model accuracy subsystem 116, a model stability subsystem 118, a visualization subsystem 120, and/or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should also be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In machine learning environments, known technical problems and difficulties exist with respect to effectively monitoring both the input data and output accuracy of a machine learning model. The process of building a machine learning model includes numerous steps and can vary depending on the type of model being built, the data available, the platform with which the model is to be deployed, and/or based on other considerations. After the model is built and tested, the model may be deployed. The deployed model may receive input data and generate predictions based on the input data. However, once deployed, effectively monitoring both the input data and the model's output accuracy becomes challenging. For instance, certain machine learning models require a large amount of oversight to ensure that they are performing accurately. In order to monitor a machine learning model in production, an analysis of the model for real production data may be performed to determine how the model performs for the production data. Additionally, an analysis of the production data is needed to assess whether the training data used to train the machine learning model is still appropriate for the datasets that the machine learning model will be processing in the production environment.

Described herein are technical solutions to the above-mentioned technical problems regarding monitoring machine learning models. In particular, the technical solutions described herein enable effective monitoring of production data being input to a trained machine learning model and an accuracy of the trained machine learning model for the production data. Differing from the training process, the production data input to the trained machine learning model may be obtained from a data feed configured to receive updated application data from one or more real-time applications. For example, the data feed may receive a data stream (e.g., the update application data) from a source, such as a data pipeline. The updated application data and the production data also differ from the training data used to train the machine learning model. For example, the training data (and the test data) may include labels indicating a result expected for the machine learning model. The updated application data may be raw data to be processed prior to being input to the trained machine learning model. The production data may be the processed updated application data that is to be input to the trained machine learning model.

In some embodiments, creating training data may be begin selecting one or more data items or sets of data items from a data corpus based on a particular machine learning model to be trained. Each data item in the training data may include a label representing an expected outcome for a model that has the data item input thereto. For example, an image depicting a cat may include a label indicating that the image depicts a cat. Alternatively, the selected data items or sets of data items may be labeled manually, or the labels previously applied to the data items may be reviewed and subsequently annotated with revised labels. The process of labeling data items can be an expensive and expansive process requiring many hours of experts analyzing each data item to identify and assign an appropriate label or labels. Creating the training data may also include analyzing the data items (prior to labels being applied and/or subsequent to labels being applied) to determine whether any data items should be excluded. In particular, certain types of machine learning models require extensive governance and approval before being deployed. For example, financial models may require many regulatory standards to be satisfied before the model is authorized to be used in the real-world. These reviews and approval processes, however take time to complete, and thus there can be substantial delay between when the data items are curated and when the training data is ready to be used for training a machine learning model. In some cases, due to the delay, the training data that is eventually created may be "stale." In other words, while the data items initially may have been representative of the data that would be input to the machine learning model after training and during deployment, due to the amount of time between when the data items were initially curated and (i) when the training data is used to train the machine learning model and/or (ii) when production data is input to the trained machine learning model, the data items may no longer represent the data that will be input to the machine learning model.

Further still, in some embodiments, the training data may not be updated frequently. Thus, it can be difficult to know whether the machine learning model, when trained, is trained on data that reflective of what the machine learning model will encounter during deployment.

In some embodiments, the production data to be input to the trained machine learning model may be compared to the training data to determine an association of the production data and the training data. For example, a distribution of features included by the training data may be compared to a distribution of features included by the production data. The comparison may indicate whether the distribution of the features of the production data is the same or similar to the distribution of features of the training data. For example, the training data may include a first amount of a feature F1, a second amount of feature F2, and a third amount of feature F3. The comparison with the production data may identify whether the production data also includes features F1, F2, and F3, and whether the amounts of each of features F1, F2, and F3 within the production data is the same or similar to the first amount, second amount, and third amount, respectively, from the training data. If distribution of the features of the production data to be input to the trained machine learning model is determined to not differ with respect to the distribution of features of the training data used to train the machine learning model, this may indicate that the production data will not result in abnormal results being produced by the trained machine learning model, as well as, or alternatively, the results being based on incorrect data. If distribution of features included by the production data is determined to differ from distribution of features included by the training data, then this may indicate a need to rebuild the machine learning model, update the training data used to train the machine learning model, or perform other actions measures. As another example, a determination may be made as to whether values of features included within the production data differ from expected values for those features. In some cases, features included within the training data may have an expected value or range of values. For instance, a plurality of data items associated with a particular type of feature may each have a value. An expected value for data items of the feature type may be determined based on the value of each data item. For example, an average, median, maximum, or minimum value for the type of feature may be determined, a range of values for the type of feature may be determined, and the like. If a value of a similar feature in the production data differs from the expected value or is outside of the range of values expected, then this may indicate that the production data will erroneous or unreliable results, and/or that the trained machine learning model may be incapable of generating predictions for the production data.

Additionally, the production data may be input to the trained machine learning model, and predicted results data may be generated based on the production data. The predicted results data may include predicted results generated by the trained machine learning model for the production data. The predicted results may be compared to observed results of the production data to determine an accuracy score for the trained machine learning model. The observed results may represent the results obtained for a real-time process based on the data items included within the updated application data. As an example, to apply for a credit card, an individual may provide input criteria to a credit card application. In some cases, in response to submitting the credit card application with the input criteria, a real-time decision process may determine, based on the input criteria, whether the individual is approved. However, in some cases, after further analysis of the individual's credit card application, historical credit information for the individual, and/or other information associated with the user, the result may be changed or may remain the same. While this typically represents a small percentage of cases (e.g., less than 20% of applications, less than 10% of applications, etc.), it nonetheless is still a possibility. In some embodiments, the results of the real-time decision process may represent an observed result associated with a data item of the updated application data. In some embodiments, the result after the further analysis may represent the observed result. The observed results may be stored in association with the updated application data. For example, for each data item included by the updated application data, a corresponding observed result may be stored with that data item (e.g., as metadata). In some embodiments, the observed results may be extracted from the updated application data. As another example, for a machine learning model used for autonomous driving, the observed result may correspond to a real-time decision made by a model. A further analysis may, in some embodiments, determine whether the observed result should have differed. In this scenario, the observed result may then refer to the different result determined by the further analysis.

In some embodiments, the accuracy of the trained machine learning model may be determined based on the predicted results of the predicted results data and the observed results from the production data. If the accuracy score satisfies a threshold accuracy condition (e.g., is less than a threshold accuracy score), then this may indicate that the training data used to train the trained machine learning model is to be updated. Alternatively, or additionally, if the accuracy score satisfies the threshold accuracy condition, then this may indicate that the trained machine learning model should be rebuilt.

Subsystems 112-120

In some embodiments, training subsystem 112 may be configured to train a machine learning model. Training subsystem 112 may perform training periodically, such as every day, every week, every month, or at other intervals. Training subsystem 112 may retrieve training data from training data database 132 for training a given machine learning model, where the particular training data used may vary depending on the machine learning model that is being trained. For example, an object recognition model may be trained using images of objects. As another example, a credit scoring model may be trained using credit applications. Some embodiments include training data having labels for each data item indicating an expected result for the machine learning model. For example, an object recognition model may be trained using images of objects including labels indicating a category of object that each image represents. This may allow the machine learning model to adaptively "learn" by computing residuals between the predicted results and the observed results (e.g., the results that would have been obtained if the machine learning model operated without error), and subsequently altering values of various hyperparameters of the machine learning model to try and minimize the residuals.

Figure 2:
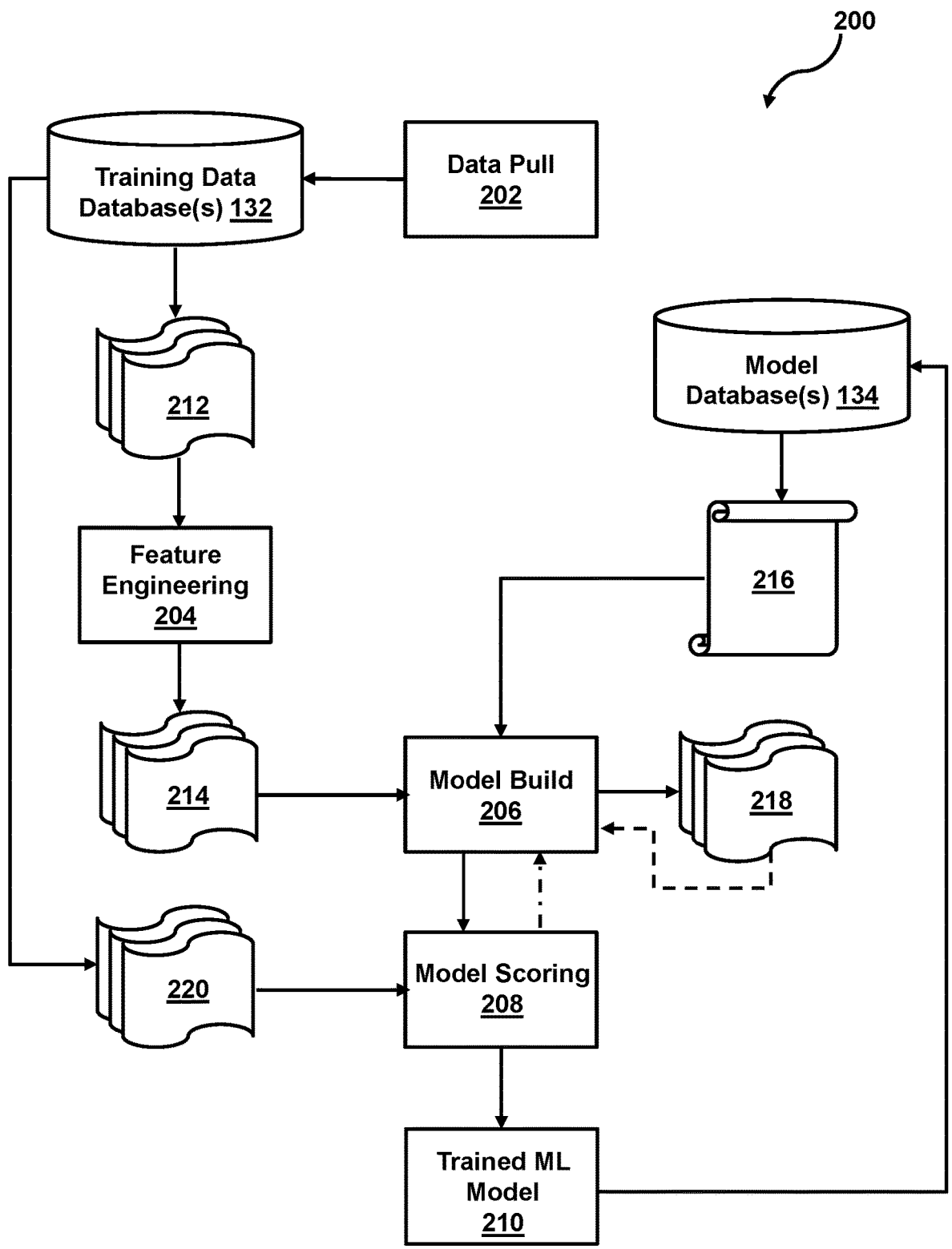
FIG. 2 shows a training process for training a machine learning model, in accordance with one or more embodiments.

As an example, with reference to FIG. 2, process 200 represents various steps capable of being performed by training subsystem 112 to produce a trained machine learning model. In some embodiments, the process of building a machine learning model includes the following steps: (1) a data pull process 202; (2) a feature engineering process 204; (3) a model build process 206; and (4) a model scoring process 208. In some embodiments, an additional data splitting process may be performed, as described below.

In some embodiments, data pull process 202 may include causing training data to be retrieved from a data corpus for training a machine learning model. For example, data pull process 202 may retrieve initial training data 212 from training data database 132. In some embodiments, training data database 132 may store data sets, and initial training data 212 may be generated from one or more of the training sets retrieved therefrom. In some embodiments, instead of generating initial training data 212 or causing initial training data 212 to be retrieved, data pull process may cause data sets to be retrieved from training data database 132 and may generate model build data from the retrieved data sets. A data splitting process may be employed to segment the model build data into initial training data 212 and test data 220. The training data may be used to train the machine learning model, whereas test data 220, which may be referred to interchangeably as "validation data 220," may be used to test an accuracy of the trained machine learning model (prior to being output from training subsystem 112). The data splitting process generally includes selecting at least some of the data sets with which were retrieved, and designating some of the selected data sets as initial training data 212, while designating some other of the selected data sets as test data 220. In some embodiments, initial training data 212 and test data 220 may be labeled data (e.g., data items including labels representing expected outcomes). For example, a data item included by initial training data 212 may represent a credit card application and the label associated with the data item may be an indication of whether the credit card application should be approved or denied. In some embodiments, the labels may be metadata associated with initial training data 212 (and test data 220).

In some embodiments, feature engineering process 204 may include refining initial training data 212 such that the data represents features needed for input to a machine learning model to be trained. Feature engineering process 204 may also refine test data 220 in a similar manner. In some embodiments, feature engineering process 20 may use domain knowledge associated with the machine learning model to be trained to extract features from initial training data 212 relevant to the machine learning model. The extracted features can be used to improve the performance of the machine learning algorithms. Feature engineering process 204 may output training data 214, which may subsequently be input to model build process 206.

In some embodiments, model build process 206 may include training a selected machine learning model 216 with training data 214. Machine learning model 216 may be selected from model database 134 based on a particular process, task, or objective of a user. For example, a convolutional neural network (CNN) may be selected from model database 134 for processes related to computer vision. The various machine learning model stored by model database 134, from which model build process 206 may select from, may include, but are not limited to (which is not to suggest that any other list is limiting), any of the following: Ordinary Least Squares Regression (OLSR), Linear Regression, Logistic Regression, Stepwise Regression, Multivariate Adaptive Regression Splines (MARS), Locally Estimated Scatterplot Smoothing (LOESS), Instance-based Algorithms, k-Nearest Neighbor (KNN), Learning Vector Quantization (LVQ), Self-Organizing Map (SOM), Locally Weighted Learning (LWL), Regularization Algorithms, Ridge Regression, Least Absolute Shrinkage and Selection Operator (LASSO), Elastic Net, Least-Angle Regression (LARS), Decision Tree Algorithms, Classification and Regression Tree (CART), Iterative Dichotomizer 3 (ID3), C4.5 and C5.0 (different versions of a powerful approach), Chi-squared Automatic Interaction Detection (CHAD)), Decision Stump, M5, Conditional Decision Trees, Naive Bayes, Gaussian Naive Bayes, Causality Networks (CN), Multinomial Naive Bayes, Averaged One-Dependence Estimators (AODE), Bayesian Belief Network (BBN), Bayesian Network (BN), k-Means, k-Medians, K-cluster, Expectation Maximization (EM), Hierarchical Clustering, Association Rule Learning Algorithms, A-priori algorithm, Eclat algorithm, Artificial Neural Network Algorithms, Perceptron, Back-Propagation, Hopfield Network, Radial Basis Function Network (RBFN), Deep Learning Algorithms, Deep Boltzmann Machine (DBM), Deep Belief Networks (DBN), Convolutional Neural Network (CNN), Deep Metric Learning, Stacked Auto-Encoders, Dimensionality Reduction Algorithms, Principal Component Analysis (PCA), Principal Component Regression (PCR), Partial Least Squares Regression (PLSR), Collaborative Filtering (CF), Latent Affinity Matching (LAM), Cerebri Value Computation (CVC), Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), Ensemble Algorithms, Boosting, Bootstrapped Aggregation (Bagging), AdaBoost, Stacked Generalization (blending), Gradient Boosting Machines (GBM), Gradient Boosted Regression Trees (GBRT), Random Forest, Computational intelligence (evolutionary algorithms, etc.), Computer Vision (CV), Natural Language Processing (NLP), Recommender Systems, Reinforcement Learning, Graphical Models, or separable convolutions (e.g., depth-separable convolutions, spatial separable convolutions, etc.).

Model build process 206 may take training data 214 as inputs for machine learning model 216, which may provide outputs 218. In some embodiments, model build process 206 may be configured to cause outputs 218 to be fed back to machine learning model 216 as input to train machine learning model 216 (e.g., alone or in conjunction with user indications of the accuracy of outputs 218, labels associated with the inputs, or with other reference feedback information). In some embodiments, model build process 206 may cause, or otherwise facilitate, machine learning model 216 to update its configurations (e.g., weights, biases, or other parameters) based on its assessment of its prediction (e.g., outputs 218) and reference feedback information (e.g., user indication of accuracy, reference labels, or other information). In some embodiments, where machine learning model 216 is a neural network, connection weights may be adjusted to reconcile differences between the neural network's prediction and the reference feedback. Some embodiments include one or more neurons (or nodes) of the neural network requiring that their respective errors be sent backward through the neural network to them to facilitate the update process (e.g., backpropagation of error). Updates to the connection weights may, for example, be reflective of the magnitude of error propagated backward after a forward pass has been completed. In this way, for example, machine learning model 216 may be trained to generate better predictions.

In some embodiments, model scoring process 208 may include testing the accuracy of the built machine learning model to determine whether machine learning model 216 has been properly trained. For example, model scoring process 208 may cause the built machine learning model to take, as input, test data 220, and may compare the outputs of the built machine learning model to the results indicated by the labels associated with test data 220. If model scoring process 208 does not yield positive results the machine learning model may be re-trained with new training data and scored, with this process repeating until the model is capable of accurately predicting results for the test data 220 (or new test data). For example, model scoring process 208 may compute an accuracy score for the predicted outputs of the built machine learning model based on a comparison of the outputs from the built machine learning model and the results stored as labels with test data 220. If the accuracy score of the built machine learning model satisfies a threshold training condition, such as the accuracy score being greater than or equal to a threshold training score, then model scoring process 208 may output trained machine learning model 210.

Figure 3:
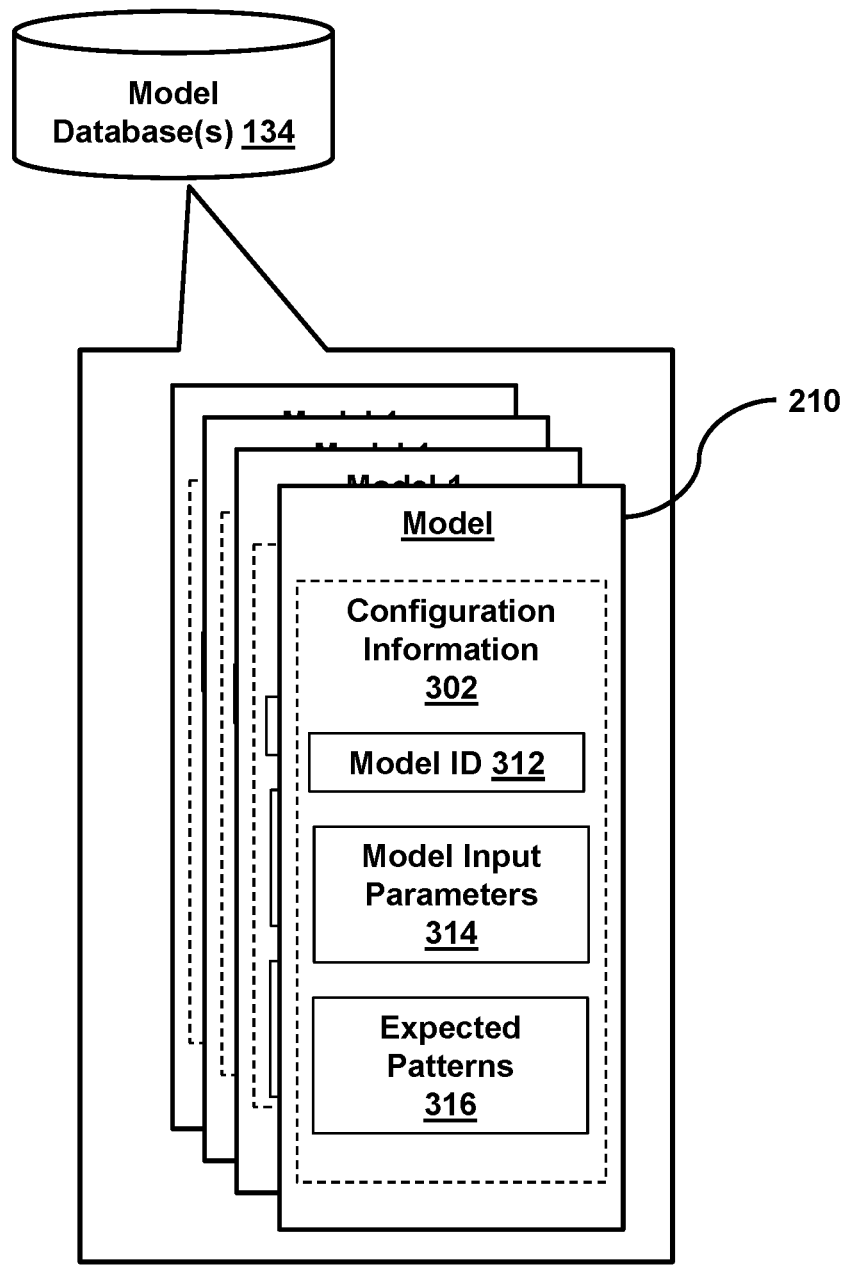
FIG. 3 shows a model database storing various machine learning models, in accordance with one or more embodiments.

Trained machine learning model 210 may be stored in model database 134 for future retrieval and deployment. As an example, with reference to FIG. 3, model database 134 may store a plurality of trained machine learning models, such as trained machine learning model 210 described above with respect to FIG. 2. Multiple instances of different types of trained machine learning models may also be stored in model database 134. Furthermore, a plurality of machine learning models to be trained (e.g., that have not yet been trained) may also be stored within model database 134, such as machine learning model 216 described above with respect to FIG. 2. For simplicity, a number of instances of trained machine learning model 210 are illustrated in FIG. 3.

Trained machine learning model 210, as well as other machine learning models stored within model database 134, may include configuration information 302. In some embodiments, configuration information 302 includes information related to a corresponding machine learning model. For instance, configuration information 302 may include a model identifier 312, model input parameters 314, and expected patterns 316. Configuration information 302 may include additional information as well, such as a model type identifier, a version number, a timestamp indicating a last use, and the like.

Model identifier 312 may represent a unique identifier associated with a particular instance of trained machine learning model 210. Model identifier 312 may enable a system and/or a user of a system to retrieve trained machine learning model 210 from model database 134. In some embodiments, model identifier 312 is represented as a string of characters (e.g., ABCD 1234). In some embodiments, model identifier 312 may indicate a type of machine learning model that trained machine learning model 210 corresponds.

For example, model identifier 312 may indicate that trained machine learning model 210 corresponds to a CNN, a RNN, a GBM, or other. In some embodiments, model identifier 312 may enable system 100 to identify a data feed with which to obtain production data from.

Model input parameters 314 may represent various parameters that may be input to trained machine learning model 210. Data to be input into trained machine learning model 210, therefore, may include parameters such as model input parameters 314. Model input parameters 314 associated with trained machine learning model 210 indicate parameters determined by the training process (e.g., process 200 of FIG. 2). In some embodiments, model input parameters 314 represent features or types of features for trained machine learning model 210. A feature represents a variable that serves as an input to a model and is used by the model to make predictions. In some embodiments, features may be orthogonal to one another. For example, each feature may occupy a dimension of an n-dimensional feature space. Model input parameters 314, in some cases, may indicate the types of features represented by data used to train machine learning model 216 to obtain trained machine learning model 210, as well as the type of features expected to be represented by data input to trained machine learning model 210. As an example, data including features, such as noise ratios, lengths of sound, relative power, etc., may serve as an input to a prediction model related to recognizing phonemes for speech recognition processes. As another example, data including features such as edges, objects, pixel information, may serve as an input to a prediction model related to computer vision analysis. As still yet another example, data including features, such as income, credit score, and biographical information may serve as an input to a prediction model related to financial applications. Each of the features (e.g., noise rations, lengths of sound, relative power, edges, objects, income, credit score, biographical information, or other features) may be different types of features. The feature type may relate to the genre of the prediction model (e.g., speech recognition models, computer vision models, etc.) or the different individual fields encompassed by a feature (e.g., length of sounds in units of time, income in units of dollars, etc.). As described herein, a feature type corresponds to a type of feature, (i.e., what the feature represents). For example, the feature type "salary information" may correspond to the feature "salary," which may be used as a model input parameter to a financially-related prediction model. In some embodiments, model input parameters 314 may also indicate hyperparameters associated with trained machine learning model 210. A hyperparameter represents a configurable variable whose value is estimated by a model based on input data. As an example, for a PCA model, a number of components to keep represents one type of hyperparameter.

Expected patterns 316 for the model input parameters may indicate distributions, trends, value ranges, or other aspects, of the features included within data to be input to a machine learning model. In some embodiments, expected patterns 316 may be determined based on training data used to train a machine learning model. For example, training data 214 used to train machine learning model 216 may have a particular distribution of features (e.g., training data 214 includes a first percentage of a first type of feature, a second percentage of a second type of feature, and so on). Based on the particular distribution of features of the training data, expected patterns 316 for model input parameters 314 may reflect that data to be input to trained machine learning model 210 will also include a same or similar distribution of features. If so, then trained machine learning model 210 should perform accurate predictions. However, if the distribution of features of data to be input to trained machine learning model 210 differs from the distribution of features of training data 214 used to train machine learning model 216 to obtain trained machine learning model 210, then the predictions of trained machine learning model 210 for data input thereto may not be accurate (i.e., the output of trained machine learning model 210 may have a low confidence score).

Some embodiments include deploying trained machine learning model 210 upon model scoring process 208 determining that the built machine learning model satisfies the threshold condition. In response to being deployed, trained machine learning model 210 may be configured to begin receiving production data and yielding results for the production data. However, if the built machine learning model does not satisfy the threshold training condition, such as the accuracy score being less than the threshold training score, then the training process may begin again with new training data, updated training data, a new model, or with other initialization conditions for training the model. In some embodiments, the threshold training score may be an accuracy score for the built machine learning model of 60% or greater (e.g., the built machine learning model accurately predicts 60% or more of test data 220), 75% or greater (e.g., the built machine learning model accurately predicts 75% or more of test data 220), 60% or greater (e.g., the built machine learning model accurately predicts 80% or more of test data 220), 90% or greater (e.g., the built machine learning model accurately predicts 90% or more of test data 220), 95% or greater (e.g., the built machine learning model accurately predicts 95% or more of test data 220), or other scores.

In some embodiments, data processing subsystem 114 may be configured to select a data feed with which to obtain production data from, which may be provided as an input to a trained machine learning model (e.g., trained machine learning model 210). Furthermore, data processing subsystem 114 may be configured to perform data processing to raw data obtained from the data feed and generate the production data to be used as input to the trained machine learning model.

Figure 4:
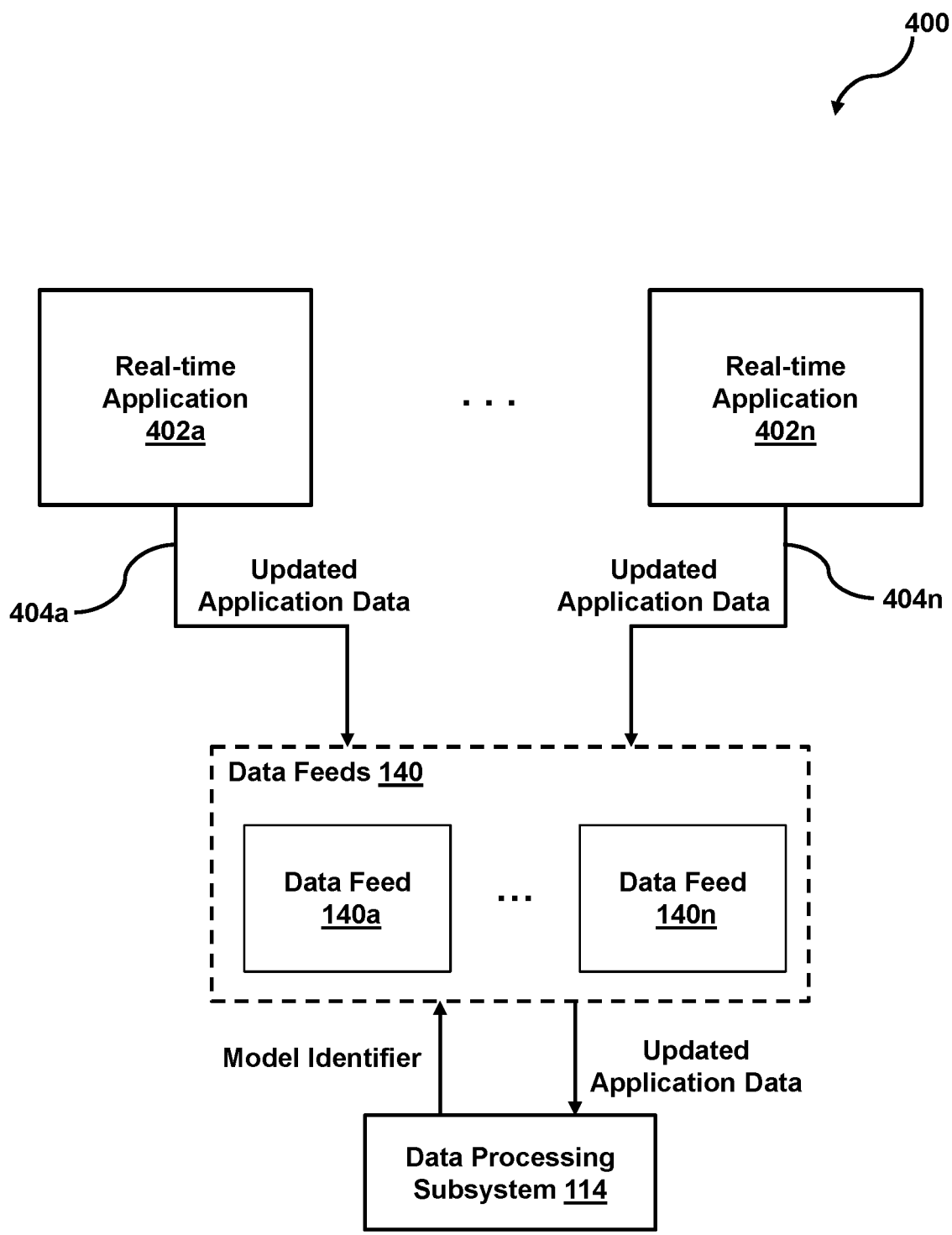
FIG. 4 shows data feeds being provided with updated application data from real-time applications, in accordance with one or more embodiments.

As an example, with reference to FIG. 4, a process 400 illustrates a selection of a data feed from data feeds 140 with which to obtain updated application data from. In some embodiments, data processing subsystem 114 may be configured to select one of data feeds 140a-140n based on a model identifier associated with a trained machine learning model obtained from training subsystem 112. As mentioned above, the model identifier (e.g., model identifier 312 of FIG. 3) may indicate a particular instance of trained machine learning model 210 that was obtained from training subsystem 112. Alternatively or additionally, the model identifier may indicate a type of machine learning model that was obtained from training subsystem 112 (e.g., a CNN for computer vision, GBM for a financial model, etc.). Based on the model identifier, a data feed may be selected from data feeds 140a-140n, and updated application data may be streamed from the selected data feed.

Each of data feeds 140a-140n may be configured to receive a continuous flow of updated application data from a corresponding real-time application. For example, real-time application 402a may generate and output updated application data 404a, which may be received by one of data feeds 140a-140n (e.g., data feed 140a). As another example, real-time application 402n may generate and output updated application data 404*n*, which may be received by another one of data feeds 140*a*-140*n* (e.g., data feed 140*n*).

In some embodiments, data feeds 140*a*-140*n* may be configured to receive updated application data for a predetermined amount of time. For example, the updated application data may be provided to a corresponding data feed 140*a*, . . . , 140*n* within a data stream. In some cases, the updated application data may not be stored persistently by the corresponding data feed 140*a*, . . . , 140*n*. In some cases, the updated application data may be buffered to local cache by a computing system associated with the data feed, which may be periodically purged to receive new updated application data from the real-time application.

Figure 5:
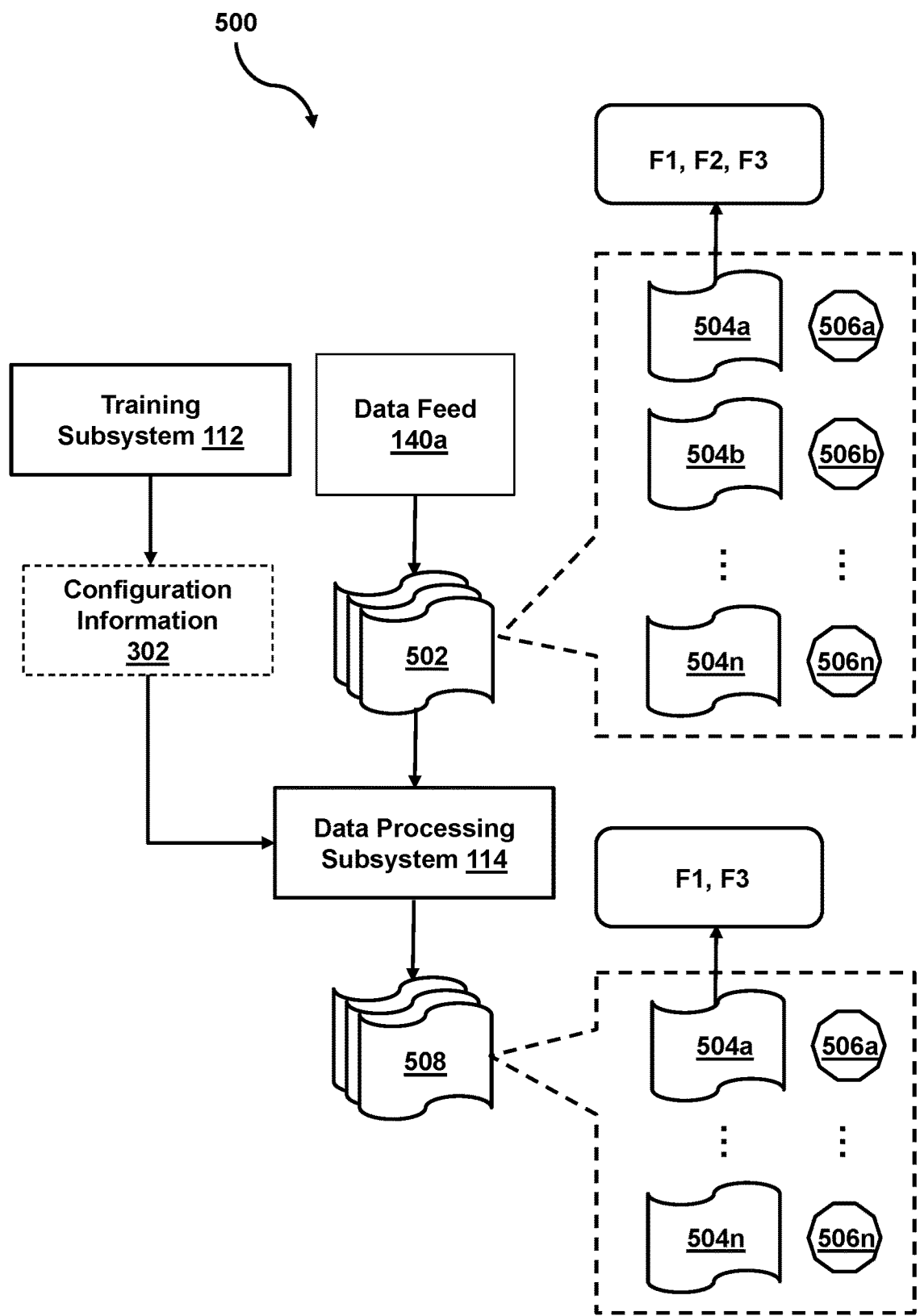
FIG. 5 shows a process for deriving production data from updated application data obtained from a data feed, in accordance with one or more embodiments.

Data processing subsystem 114 may be further configured to generate production data from the updated application data retrieved from a selected data feed. As an example, with reference to FIG. 5, a process 500 is illustrated for obtaining updated application data from a selected data feed and deriving production data from the updated application data via data processing subsystem 114. In some embodiments, data feed 140*a* may represent the selected data feed with which updated application data 502 is obtained from. Updated application data 502 may include a plurality of data items representing a plurality of feature sets 504*a*-504*n* and observed results 506*a*-506*n* respectively corresponding to each of the plurality of feature sets 504*a*-504*n*. Each of feature sets 504*a*-504*n* may include one or more types of features represented by updated application data 502. For example, one of feature sets 504*a*-504*n* may include the feature type "salary information," corresponding to a feature "salary," which may be used as a model input parameter to a financially-related prediction model.

Each of observed results 506*a*-506*n* may indicate a result obtained via an automated decision process, an enhanced review decision process, or other decision making process. In some embodiments, the automated decision process may be made in real-time. The automated decision process may provide a result given an input data item having one or more feature sets (e.g., feature sets 504*a*-504*n*) within a predetermined amount of time the data item being input. For example, the observed result may be obtained from the automated decision process in less than 30 seconds, less than 15 seconds, less than 10 seconds, less than 5 seconds, or within other amounts of time. In some embodiments, the automated decision process may determine an observed result for a data item based on the feature sets, and thus the features, represented by the data item. Furthermore, different feature sets can cause different observed results.

As an example, the automated decision process may correspond to a real-time credit card application approval process. The example real-time credit card application approval process may take the input features provided by an individual and determine whether the individual is approved/not approved for a credit card based on the input features. For example, an individual may input annual salary information, length of employment, geographical information, and the like, into the real-time credit card application. Based on these inputs, the real-time credit card application approval process may either approve or not approve the individual for the credit card. The approval/non-approval of the individual may represent an example of an observed result, where the credit card application may represent the data item, and the information provided by the individual via the credit card application may represent the feature sets including features such as annual salary information, length of employment, geographical information, etc.

As another example, the automated decision process may correspond to a real-time credit determination process, whereby an amount of credit is determined for an individual based on information provided by a user to a credit application. Similar to the real-time credit card application approval process example described above, an individual may provide, as an input, annual salary information, length of employment, geographical information, and the like, into the real-time credit determination process. Based on the inputs, the real-time credit determination process may determine an amount of credit to allocate to the individual (or an account associated with the individual). The amount of credit may represent another example of an observed result, where the credit application may represent the data item, and the information provided by the individual via the credit application may represent the feature sets including features such as annual salary information, length of employment, geographical information, etc.

While the aforementioned examples relate to financial real-time automated processes, applications outside of finance are also applicable. For example, the automated decision process may correspond to an autonomous driving decision process. In this example, the real-time object detection process may take, as an input, an image, a frame from a real-time video feed, a feature vector indicating objects detected within an image or frame from a video, and the like. Based on the inputs, the autonomous driving decision process may generate a decision regarding a driving maneuver to be performed by a vehicle. For example, the decision may include causing the vehicle to turn right or left, how much to turn the vehicle, whether to speed up or slow down the vehicle, or to perform a different maneuver. The maneuver to be performed may represent yet another example of an observed result, where the input image, frame, feature vector, etc. may represent the data item, and detected objects may represent the feature sets including features such as type of object detected, distance to the detected object, velocity, directionality, etc.

As an example, the enhanced review decision process may correspond to a subsequent review of the credit card application approval process. For instance, after the real-time credit card application approval process generates an initial result, the credit card application and initial result may be provided to an enhanced review system for determining whether the initial result was correct. This may include providing the credit card application to a robust set of algorithms to determine the eligibility of the individual, allowing one or more human reviewers to analyze the credit card application, and the like. Based on the enhanced review system's analysis of the real-time credit card application approval process, an approval/non-approval of the individual's credit card application may be generated. In this example, the observed result may represent the approval/non-approval of the individual's credit card application, where the credit card application may represent the data item, and the information provided by the individual via the credit card application may represent the feature sets including features such as annual salary information, length of employment, geographical information, etc.

As another example, the enhanced review decision process may correspond to a subsequent review of the credit determination process. In this example, an enhanced review system may determine whether the real-time credit determination process generated an appropriate an amount of credit for an individual based on information provided by the individual via a credit application. This may include providing the credit card application to a robust set of algorithms to determine an amount of credit to be allotted to the individual, allowing one or more human reviewers to analyze the credit card application and determine an amount of credit to be allotted to the individual, and the like. Based on the enhanced review system's analysis of the credit determination process, an amount of credit to be allocated to the individual (or an account associated with the individual) may be generated. Similar to the real-time credit determination process, the amount of credit determined by the enhanced review system's analysis may represent another example of an observed result, where the credit application may represent the data item, and the information provided by the individual via the credit application may represent the feature sets including features such as annual salary information, length of employment, geographical information, etc.

As yet another example, the enhanced review decision process may correspond to a subsequent review of the autonomous driving decision process. In this example, an enhanced review system may determine whether the autonomous driving decision process generated an appropriate decision regarding a driving maneuver to be performed by a vehicle. This may include providing the input information (e.g., the image, frame from the video feed, feature vector, etc.) to a robust set of algorithms to determine a maneuver to be performed, allowing one or more human reviewers to analyze the input information and determine a maneuver to be performed, and the like. Based on the enhanced review system's analysis of the autonomous driving decision process, a maneuver to be performed may be generated. For example, the decision may include causing the vehicle to turn right or left, how much to turn the vehicle, whether to speed up or slow down the vehicle, or to perform a different maneuver. In some embodiments, the maneuver determined by the enhanced review system may differ from the real-time autonomous driving decision process's result. The maneuver to be performed, determined by the enhanced review system, may represent yet another example of an observed result, where the input image, frame, feature vector, etc., may represent the data item, and detected objects may represent the feature sets including features such as type of object detected, distance to the detected object, velocity, directionality, etc.

In some embodiments, data processing subsystem 114 may be configured to take, as input, configuration information 302 from training subsystem 112. Configuration information 302 may include, for example, model input parameters associated with a trained machine learning model that was selected and obtained from training subsystem 112. The trained machine learning model may represent a model to be monitored by system 100 for data anomalies within production data to be input to the trained machine learning model. Furthermore, system 100 may monitor an accuracy of the trained machine learning model for the production data. In some embodiments, data processing subsystem 114 may extract feature sets 504a-504n and observed results 506a-506n corresponding to feature sets 504a-504n from updated application data 502 obtained from data feed 140a to generate initial production data. Data processing subsystem 114 may be configured to extract feature sets 504a-504n and observed results 506a-506n corresponding to feature sets 504a-504n from updated application data 502 based on configuration information 302. For example, feature sets 504a-504n and observed results 506a-506n corresponding to feature sets 504a-504n may be extracted from updated application data 502 based on model input parameters included by configuration information 302 (e.g., model input parameters 314). The model input parameters may indicate which features are relevant to the trained machine learning model to be monitored by system 100. For instance, feature set 504a may include features F1, F2, and F3. Based on the model input parameters included by configuration information 302, data processing subsystem 114 may extract feature set 504a (as well as other feature sets) including features F1, F2, and F3, such that the initial production data includes feature set 504a, which includes features F1, F2, and F3. As an example, the model input parameters may indicate that features such as salary, residency, and the like may be relevant to a finance-related machine learning model. Thus, in this example, data processing subsystem 114 may be configured to extract feature sets including features related to features such as salary, residency, etc., from updated application data 502. Furthermore, data processing subsystem 114 may be configured to select data feed 140a based on the model to be monitored being a finance-related machine learning model.

In some embodiments, data processing subsystem 114 may be further configured to mask one or more features or results of the initial production data based on expected patterns for the model input parameters. The expected patterns for the model input parameters may be included in configuration information 302 and may indicate an expected distribution of features in the production data. For instance, the expected distribution of features may be based on a distribution of features of the training data used to train the trained machine learning model to be monitored by system 100. As an example, if the training data included a first amount of feature F1 and a second amount of Feature F3, then the production data to be provided as input to the trained machine learning model should include a same or similar amount of feature F1 and a same or similar amount of feature F3. If not, the output from the machine learning model may not be an accurate result because the machine learning model was trained based on different features, or different amounts of features. The expected patterns for the model input parameters may additionally indicate an expected value associated with a given feature or features in the production data. If a value associated with a particular feature included in the production data differs from the expected value of that feature, then this may indicate that the value is an outlier, and the data item corresponding to that value of that feature should be masked. In some embodiments, this process may be referred to as outlier removal.

As mentioned above, the initial production data may be generated from updated application data 502. Data processing subsystem 114 may mask one or more features or results from the initial production data to generate production data 508. Production data 508 may include some or all of the feature sets and observed results from updated application data 502. For example, production data 508 may include feature sets 504a-504n and observed results 506a-506n, but may not include feature set 504b and observed result 506b. Thus feature set 504b and observed result 506b may be masked by production data. In some embodiments, masking feature sets and/or observed results may include removing the feature sets and/or observed results from the initial production data. In some embodiments, masking feature sets and/or observed results may include applying a tag to data representing the feature sets and/or the observed results such that when the production data is input to the trained machine learning model, the trained machine learning model does not generate predictions based on the masked feature sets and/or observed results. In some embodiments, masking one or more features or results of the initial production data may include masking at least one feature of feature sets from the initial production data, masking at least one result of the observed results from the initial production data, or both. The at least one feature of the feature sets that may be masked may be referred to as a "masked feature" or "masked features." The at least one result of the observed results that may be masked may be referred to as a "masked result" or "masked results." As an example, feature set 504a from updated application data 502, which may be included in the initial production data upon extraction, may include features F1, F2, and F3. Based on the expected patterns of the model input parameters indicated by configuration information 302, feature F2 may be masked such that production data 508 including feature set 504a includes features F1 and F3, but not feature F2. As another example, observed result 506b associated with feature set 504b from updated application data 502 may be masked based on the expected patterns of the model input parameters indicated by configuration information 302 such that production data 508 does not include feature set 504b or observed results 506b.

In some embodiments, model accuracy subsystem 116 may be configured to compute an accuracy of a trained machine learning model based on production data generated by data processing subsystem 114. The accuracy of the trained machine learning model may indicate how well the trained machine learning is able to predict results for production data. This accuracy differs from the accuracy computed during the training process (e.g., model scoring process 208) because the data used to compute the accuracy during the training process is derived from training data database 132. However, the accuracy of the trained machine learning model determined by model accuracy subsystem 116 may use production data, which is obtained from a data feed and is available for only a limited amount of time (e.g., while in the data stream).

Figure 6:
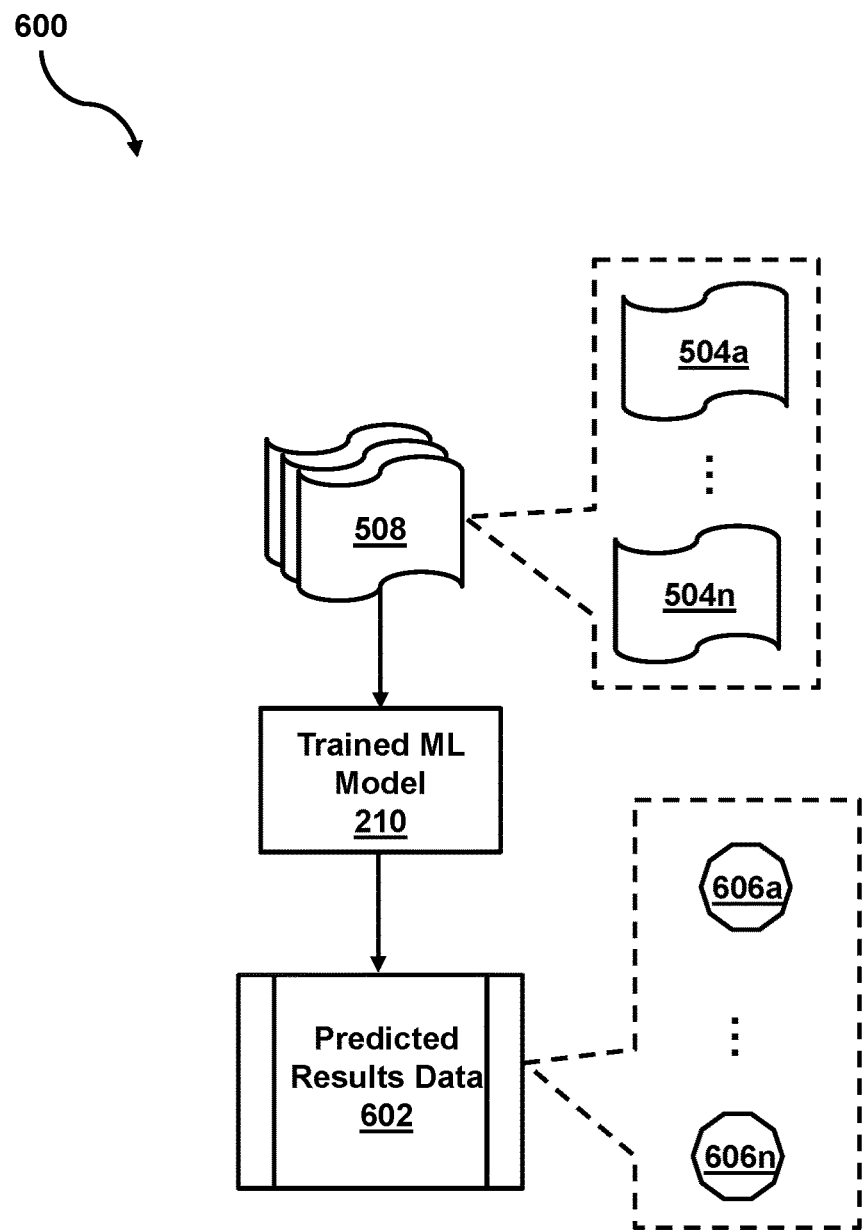
FIG. 6 shows a process for generating predicted results data based on production data input to a trained machine learning model, in accordance with one or more embodiments.

As an example, with reference to FIG. 6, a process 600 is shown describing computation of an accuracy score for a trained machine learning model. In some embodiments, production data 508 may be obtained from data processing subsystem 114. For example, production data 508 may be obtained from updated application data 502, where updated application data 502 may be obtained from data feed 140a. In some embodiments, initial production data may be generated from the updated application data (e.g., updated application data 502) by extracting feature sets and observed results (e.g., feature sets 504a-504n and observed results 506a-506n), and the production data may be generated by masking one or more features and/or results of the initial production data.

As seen in FIG. 6, production data 508 may include data items representing feature sets 504a-504n. For example, production data 508 may include a stream of credit card applications, and each credit card application may include information such as an applicant's annual salary, residence, employment history, and the like. The information included by each credit card application may represent a feature set, and thus the production data may include a plurality of data items representing various feature sets, such as feature sets 504a-504n. In some embodiments, production data 508 may include feature sets 504a-504n, however production data 508 may not include observed results 506a-506n corresponding to feature sets 504a-504n. In some embodiments, production data 508 may include feature sets 504a-504n and observed results 506a-506n corresponding to feature sets 504a-504n, however observed results 506a-506n may be masked so as to not be input to trained machine learning model 210.

Trained machine learning model 210 may be configured to take, as input, production data 508 and generate predicted results data 602. Predicted results data 602 may include results 606a-606n, which may be generated based on feature sets 504a-504n of production data 508. Predicted results 606a-606n may represent predictions from trained machine learning model 210 for each feature set input to trained machine learning model. For example, predicted result 606a may represent a predicted result generated by trained machine learning model 210 for a data item input to trained machine learning model 210 that includes feature set 504a.

In some embodiments, model accuracy subsystem 116 may be configured to compute an accuracy score for trained machine learning model 210 based on predicted results data 602 and production data 508. For example, model accuracy subsystem 116 may determine a difference between observed results 506a-506n and predicted results 606a-606n. Based on the difference and a number of feature sets included by production data 508 (e.g., how many feature sets are included by feature sets 504a-504n), an accuracy score of trained machine learning model 210 may be determined.

In some embodiments, model accuracy subsystem 116 may determine whether the computed accuracy score for trained machine learning model 210 satisfies a threshold accuracy condition. For example, the threshold accuracy condition may be satisfied if the accuracy score is less than a threshold accuracy score. As another example, the threshold accuracy condition may be satisfied if the accuracy score is greater than or equal to a threshold accuracy score. In some embodiments, the threshold accuracy score may be determined based on an accuracy score previously determined for trained machine learning model 210 during the training process. For instance, during training, trained machine learning model 210 may have been determined to have an accuracy score of S1 based on test data 220. The threshold accuracy score for trained machine learning model 210 based on production data 508 may be determined using accuracy score S1. In some embodiments, the threshold accuracy score may be the same or similar to accuracy score S1. For example, if accuracy score S1 is 80% (e.g., indicating that, during training, the trained machine learning model successfully predicted 80% of the results of the test data), the threshold accuracy score may be 80%+/−δ, where δ is a configurable value depending on the particular machine learning model. For example, δ may be 2% or more, 5% or more, 10% or more, or other values.

If model accuracy subsystem 116 determines that trained machine learning model satisfies the threshold accuracy condition, then model accuracy subsystem 116 may generate a notification for system 100. In some embodiments, the notification may indicate that the training data used to train the trained machine learning model (e.g., trained machine learning model 210) is to be updated. For example, new data sets may be retrieved and combined with some or all of the data sets used to generate the training data (e.g., training data 214) used to train the machine learning model (e.g., machine learning model 216). Some embodiments include using some of the production data, if available, to generate updated training data. In some embodiments, training subsystem 112 may use the updated training data to re-train machine learning model 216, a new instance of machine learning model 216, or a new machine learning model. In some embodiments, the notification may indicate that the trained machine learning model is to be rebuilt. For example, a new instance of machine learning model 216 may be retrieved from model database 134, and training subsystem 112 may perform process 200 to train the new instance of machine learning model 216 using training data 214, different training data, updated training data (e.g., updated from training data 214), or using other training data.

In some embodiments, model accuracy subsystem 116 may be configured to compute residuals between predicted results of predicted results data 602 and observed results 506a-506n of production data 508. Residuals represent a difference between what is actually detected and what is predicted. For example if, for a machine learning model configured to predict a credit score for a given credit application, a predicted credit score is 700 and an actual credit score is 750, then the residual would be 50. In some embodiments, visualization subsystem 120 may generate a graphical representation of the residuals to identify which feature or features contribute most or least to residuals. For example, the residuals may indicate that geographical location affects a credit score greater than expected or desired. In such cases, the trained machine learning model may, during a rebuild or subsequent training, or during deployment, modify one or more parameters (e.g., hyperparameters) to decrease or increase the effect of geographical location on credit score predictions. In some embodiments, an accuracy of the trained machine learning model may be determined based on the residuals. For instance, because the residuals reflect the difference between the predicted results and the observed results for a trained machine learning model, the accuracy score of the trained machine learning model may also be determined based on the residuals.

In some embodiments, a contribution to the residuals for each feature of a plurality of features represented by the production data may be determined. For example, feature set 504a, representing features F1 and F3, may be associated with observed result 506a. Furthermore, feature set 504a may, when input to trained machine learning model 210, cause trained machine learning model 210 to produce predicted result 606a. A contribution to the residual (e.g., the difference between predicted result 606a and observed result 506a) for both features F1 and F3 may be determined to identify whether feature F1 and/or feature F3 contribute to the residuals of production data 508 and predicted results data 602 by more than a threshold amount. In some embodiments, if it is determined that a contribution to the residuals of one or more of the features included by the feature sets of the production data is equal to or greater than a threshold amount of contribution for residuals, model accuracy subsystem 116 may cause the training data to be updated and/or cause the trained machine learning model to be rebuilt. As an example, the threshold amount of contribution for the residuals may be greater than 5%, greater than 10%, greater than 20%, or other amounts. For instance, if feature F1's contribution to the residuals computed between predicted results 606a-606n of predicted results data 602 and observed results 506a-506n of production data 508 is greater than the threshold amount of contribution (e.g., feature F1 contributes to the residuals by more than 5%), then this may indicate that training data 214 should be updated, and/or trained machine learning model 210 should be rebuilt. determining a contribution to the residuals for each feature of a plurality of features represented by the production data; and In some embodiments, model stability subsystem 118 may be configured to determine a stability score for the trained machine learning model based on the production data and the training data. The stability score may indicate how similar the production data being input to the trained machine learning model is to the training data used to train the trained machine learning model. In some embodiments, the stability score may indicate whether a distribution of features included by the production data and to be input to the trained machine learning model is the same or similar to a distribution of features included by the training data used to train the trained machine learning model. If the production data includes a distribution of features that greatly differs from the distribution of features included by the training data, then the trained machine learning model may be unable to generate predictions based on the production data, the predictions made by the trained machine learning model for the production data may be unreliable, increase latency in generating predictions for the production data, or cause other issues to occur.

Figure 7:
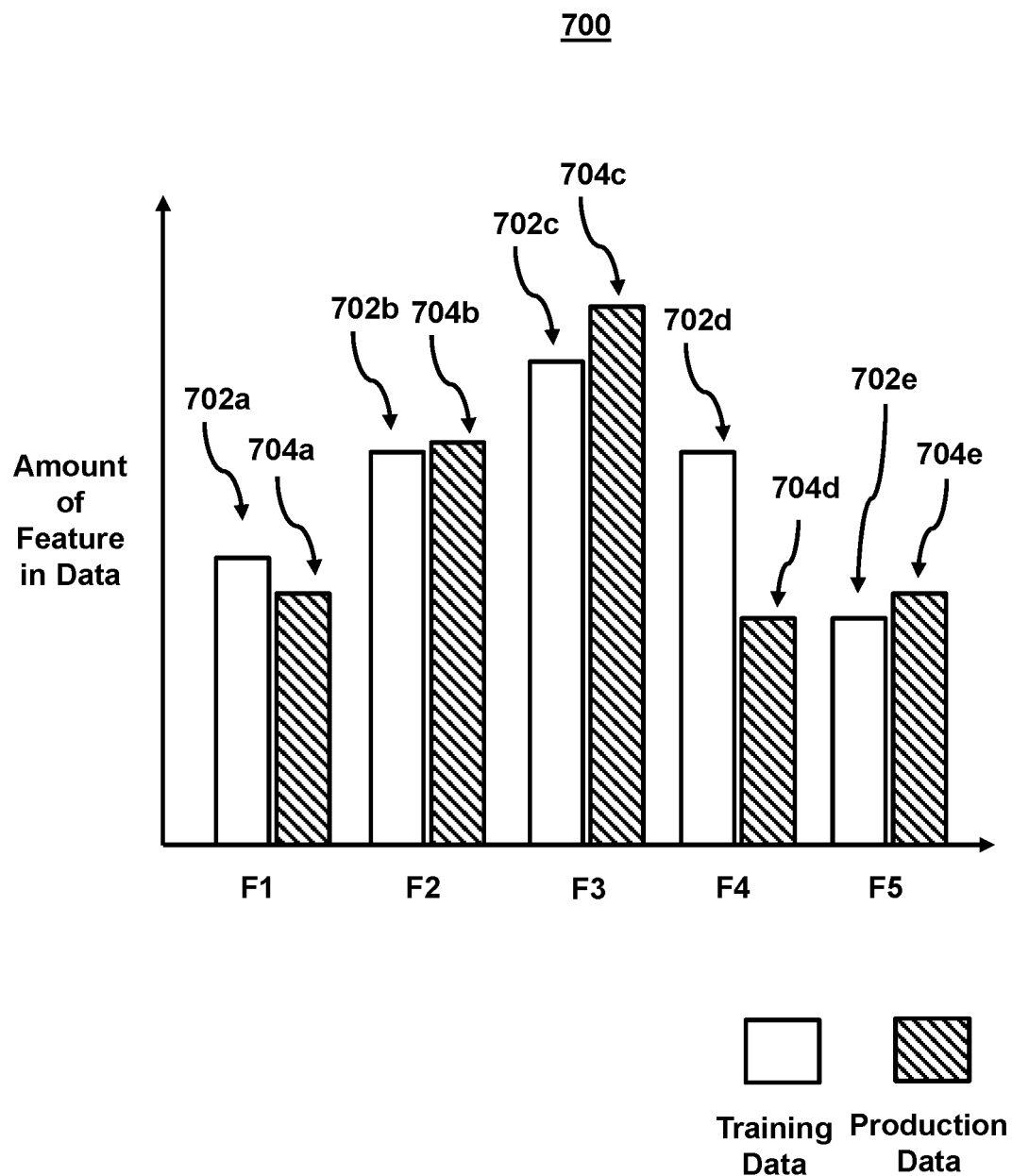
FIG. 7 shows a graph describing a distribution of features within training data and production data, in accordance with one or more embodiments.

As mentioned previously, the training data used to train the trained machine learning model may include a distribution of features. The training data may include a plurality of data items, and each data item may include one or more feature sets representing a set of features. The amount of each feature occurring within the training data may form a distribution of features. As an example, with reference to FIG. 7, graph 700 describes an example distribution of features from training data used to train a machine learning model. For instance, each of features F1-F5 may be represented within the training data by a certain amount. As seen in graph 700, in this example, the training data, (e.g., training data 214), represented by the non-filled bars, may include a first amount 702a of feature F1, a second amount 702b of feature F2, a third amount 702c of feature F3, a fourth amount 702d of feature F4, and a fifth amount 702e of feature F5. In the example, first amount 702a of feature F1 may be less than second amount 702b of feature F2; second amount 702b of feature F2 may be less than third amount 702c of feature F3; fourth amount 702d of feature F4 may be less than third amount 702c of feature F3; and fifth amount 702e of feature F5 may be less than third amount 702c of feature F3. The production data, (e.g., production data 508), may include the same or similar distribution of features. For example, the production data, represented by the striped bars, may also include a first amount 704a of feature F1, a second amount 704b of feature F2, a third amount 704c of feature F3, a fourth amount 704d of feature F4, and a fifth amount 704e of feature F5. In the example, first amount 704a of feature F1 may be less than second amount 704b of feature F2; second amount 704b of feature F2 may be less than third amount 704c of feature F3; fourth amount 702d of feature F4 may be less than first amount 702a of feature F1, second amount 702b of feature F2, third amount 702c of feature F3, and fifth amount 704e of feature F5; and fifth amount 704e of feature F5 may be approximately the same as first amount 704a of feature F1.

As seen in graph 700, the distribution of features F1-F5 from the training data may be substantially similar to the distribution of features F1-F5 from the production data. This may indicate that the production data does not include any abnormalities in features that could cause problems for the trained machine learning model when computing predictions for the production data.

In some embodiments, model stability subsystem 118 may compute a stability score for the trained machine learning model based on the production data to be input to the trained machine learning model and the training data used to train the trained machine learning model. The stability score may indicate a difference between the features included by the training data and the features included by the production data. Model stability subsystem 118 may use different metrics to compute the stability score including, but not limited to (which is not to suggest that other lists are limiting), population stability index (PSI), characteristic stability index (CSI), principle component analysis (PCA), or other metrics. PSI measures an amount of shift in a population of variables between two data sets. CSI identifies which variable is causing a shift in the population of variables. PCA determines which variable is having the greatest amount of influence from the population of variables. As an example, model stability subsystem 118 may compute a PSI value based on the training data and the production data. The PSI value may indicate a difference between the distribution of features included within the training data and an observed distribution of features included within the production data The PSI value may be computed by determining, for each feature, a percentage of actual similarities between the training data and the production data, determining, for each feature, a percentage of expected similarities between the training data and the production data, determining a difference between the percentage of actual similarities and the percentage of expected similarities, and multiplying the difference by the natural log of the percentage of actual similarities divided by the percentage of expected similarities. This process may be repeated and summed for each feature, and the result may represent the PSI value.

In some embodiments, model stability subsystem 118 may be configured to determine whether the stability score satisfies a threshold stability condition. The threshold stability condition may be satisfied if the computed stability score for the production data is less than a threshold stability score. As an example, model stability subsystem 118 may determine a PSI value based on the training data (e.g., training data 214) and the production data (e.g., production data 508). Model stability subsystem 118 may determine whether the PSI value determined based on the training data and the production data is less than a threshold PSI value. If so, the PSI value (i.e., the stability score) may be classified as satisfying the threshold stability condition. Some embodiments include generating a notification to update the training data and/or cause the trained machine learning model to be rebuilt in response to determining that the computed stability score (e.g., the PSI value) is satisfies the threshold stability condition (e.g., the PSI value is less than the threshold PSI value). In some embodiments, the threshold PSI value may be a PSI value less than or equal to 0.0, less than or equal to 0.001, less than or equal to 0.01, less than or equal to 0.1, or other values.

In some embodiments, model stability subsystem 118 may be configured to determine whether a particular value of a feature included within the production data differs from an expected value for that feature based on the training data. For example, if the training data used to train the trained machine learning model included credit card applications, each credit card application may include a feature of annual salary for the applicant. A value provided by each application for this feature may be extracted from each application, and an average value for this feature may be determined. For example, the average annual salary of applicants included within credit card applications used to train the trained machine learning model to approve/not-approve each applicant for a credit card may be computed by summing the value of annual salary from each credit card application and dividing the summed value by the number of applications to obtain the average value. When analyzing the production data, model stability subsystem 118 may determine whether a value associated with the annual salary feature for a given data item of the production data differs from the average value by more than a threshold amount. For example, model stability subsystem 118 may determine whether the value associated with the annual salary feature for the given data item of the production data differs from the average value by more one or more standard deviations. If so, then this may indicate that some of the production data does not reflect the data expected to be input to the trained machine learning model. Therefore, model stability subsystem 118 may generate a notification to cause the training data to be updated and/or the trained machine learning model to be rebuilt. In some embodiments, model stability subsystem 118 may determine whether a number of instances of a value associated with a given feature in the production data differing from an expected value for that feature occurs in the production data more than a threshold number of times. For example, a single instance of a value for average salary exceeding the threshold amount may not necessitate updating the training data or rebuilding the model. However, a large portion (e.g., greater than 10%, greater than 20%, greater than 50%, etc.) of the production data having a value exceeding the threshold amount may require the training data to be updated and/or the model rebuilt.

In some embodiments, model stability subsystem 118 may be configured to determine a similarity score between the training data and the production data based on the expected pattern of features represented by the training data and observed patterns of features represented within the production data. For example, the expected pattern of features represented by the training data may indicate a substantially static distribution of features included by the training data. This may include each feature being equally represented by the training data. Model stability subsystem 118 may determine whether the patterns of features observed within the production data is also the same or similar to the pattern of features within the training data. Continuing the previous example, model stability subsystem 118 may determine whether the production data also includes a substantially static distribution of the same features as compared to the training data. In some embodiments, model stability subsystem 118 may determine whether the similarity score satisfies a threshold similarity condition. The threshold similarity condition may be satisfied if the similarity score is greater than or equal to a threshold similarity score. The threshold similarity score may, for example, indicate a similarity between the training data and the production data of 75% or greater similarity, 80% or greater similarity, 90% or greater similarity, and so on. In response to determining that the similarity score fails to satisfy the threshold similarity condition, model stability subsystem 118 may cause the trained machine learning model to be rebuilt and/or cause the training data used to train the trained machine learning model to be updated. In some embodiments, the similarity score may include the stability score.

In some embodiments, model stability subsystem 118 may further be configured to detect a number of anomalies within the production data. For example, model stability subsystem 118 may determine a number of NULL values present within the production data. A NULL value, which may also be referred to herein interchangeably as a "NULL entry," indicates that a data value for a given data field does not exist. For example, a NULL value for the feature "annual salary," (e.g., one type of data field that data can be input to in an example credit card application), may indicate that no value exists for this feature for a particular data item. Model stability subsystem 118 may determine whether a number of NULL values in the production data is greater than a threshold number of NULL values. If so, model stability subsystem 118 may generate a notification to cause the training data to be updated and/or the trained machine learning model to be rebuilt.

Figure 8:
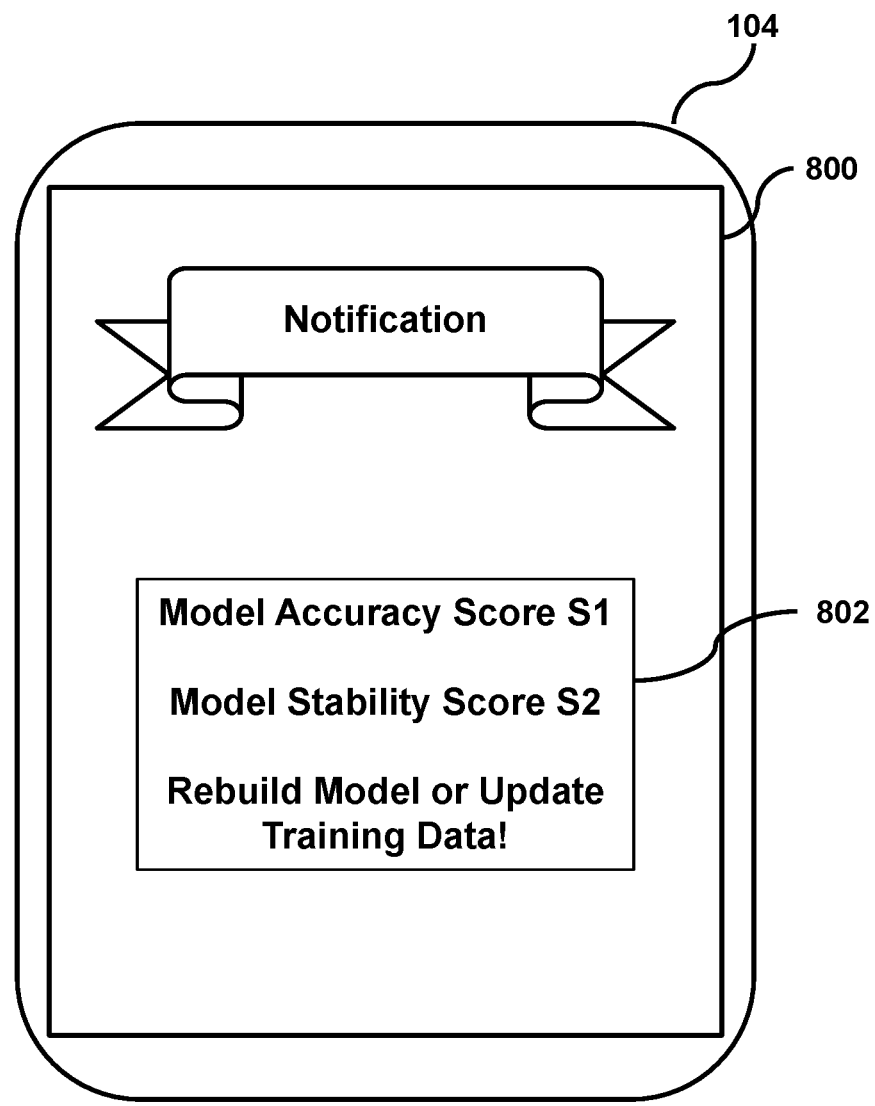
FIG. 8 shows an user interface displaying a notification for causing a machine learning model to be rebuilt or training data to be updated, in accordance with one or more embodiments.

In some embodiments, visualization subsystem 120 may be configured to generate one or more visualizations for a user employing a component of system 100 to monitor a performance of a trained machine learning model. For instance, visualization subsystem 120 may generate a user interface, a graphic, a message, an alert, a notification, and the like, to provide information regarding how the trained machine learning model is performing. As an example, with reference to FIG. 8, visualization subsystem 120 may generate a user interface 800 to be rendered on client device 104. In some embodiments, user interface 800 may display a notification 802 conveying information related to how a trained machine learning model is performing based on model monitoring performed by system 100. Notification 802 may include a model accuracy score S1, a model stability score S2, an indication that the trained machine learning model being monitored should be rebuild and/or the training data used to train the trained machine learning model should be updated, or other information. In some embodiments, as mentioned above, in response to determining that an accuracy score of the trained machine learning model satisfies a threshold accuracy condition, model accuracy subsystem 116 may generate a notification to cause the trained machine learning model to be rebuilt or the training data to be updated. In some embodiments, as mentioned above, in response to determining that a stability score of the trained machine learning model satisfies a threshold stability condition, model stability subsystem 118 may generate a notification to cause the trained machine learning model to be rebuilt or the training data to be updated. The notification, or data representing the notification, may be provided to visualization subsystem 120. In some embodiments, visualization subsystem 120 may generate user interface 800 including the notification (e.g., notification 802), and may provide the notification to client device 104. A user operating client device 104 may then be able to cause the trained machine learning model to be rebuilt, the training data to be updated, perform a different action, or perform no action.

In some embodiments, visualization subsystem 120 may be configured to generate a visualization of the residuals between predicted results 606a-606n of predicted results data 602 and observed results 506a-506n of production data 508. The visualization may depict an amount of contribution each feature included by feature sets 504a-504n has on the total residuals. In some embodiments, the visualization may be provided to client device 104 within a user interface such that a user may be able to cause or otherwise facilitate rebuilding of trained machine learning model 210 and/or updating of training data 214.

Figure 9:
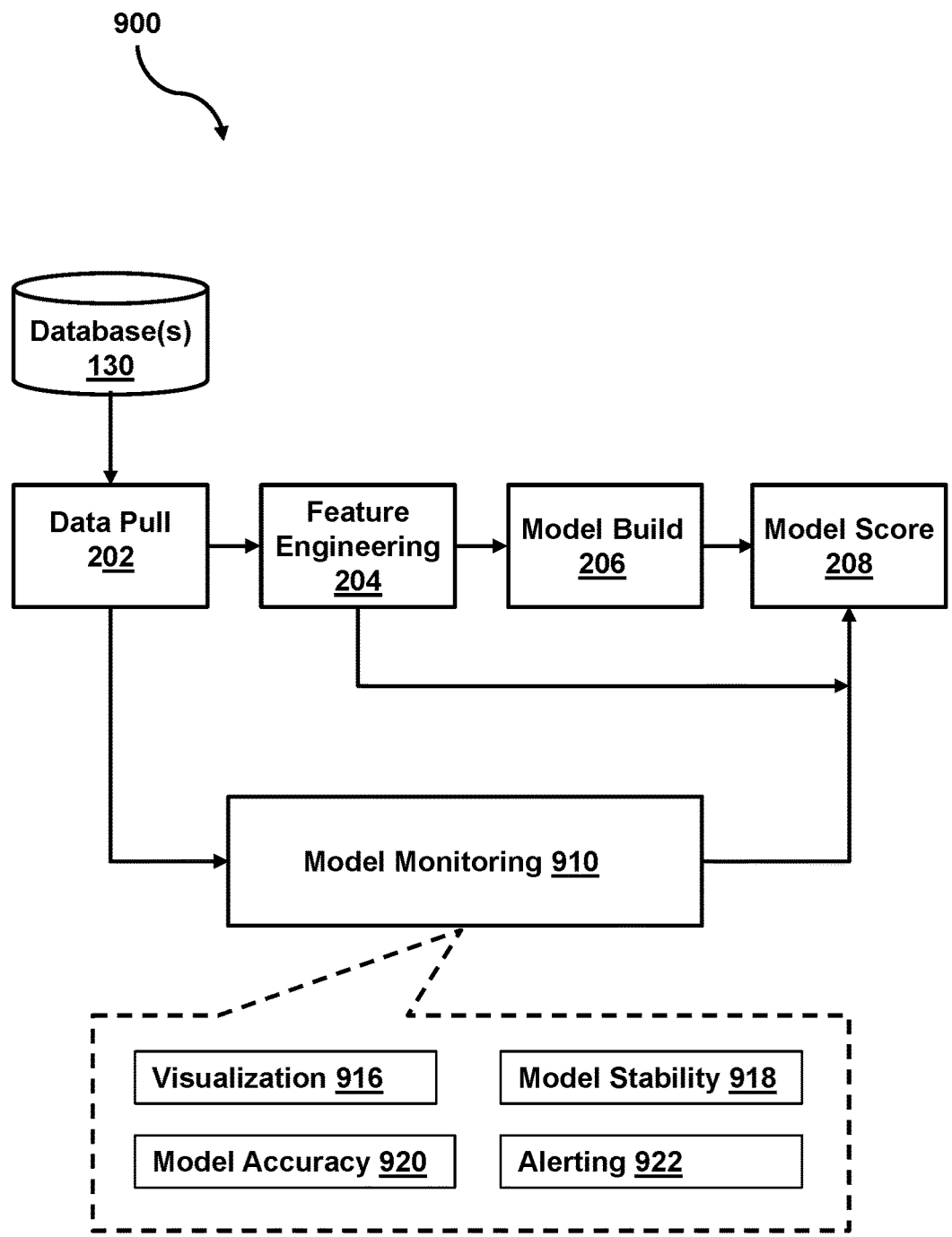
FIG. 9 shows an architecture for performing model monitoring, in accordance with one or more embodiments.

FIG. 9 shows an architecture 900 for performing model monitoring, in accordance with one or more embodiments. Architecture 900 includes various modules and processes cable of being performed to train, deploy, and monitor a machine learning model. For example, architecture 900 may include model training. Model training may include data pull process 202, feature engineering process 204, model build process 206, and model scoring process 208, each of which is described in greater detail above with reference to FIG. 2. In some embodiments, a model monitoring process 910 may be performed. Model monitoring process 910 may be an orthogonal process that enables analysis of a trained machine learning model for production data as the production data is provided to the trained machine learning model. Model monitoring process 910 may include modules such as visualization 916, model stability 918, model accuracy 920, model and alerting 922. In some embodiments, model accuracy subsystem 116 may be used by model monitoring process 910 as the module for model accuracy 920. In some embodiments, model stability subsystem 118 may be used by model monitoring process 910 as the module for model stability 918. In some embodiments, visualization subsystem 120 may be used by model monitoring process 910 as the model for visualization 916. The module for alerting 922 may be employed by one or more of model accuracy subsystem 116, model stability subsystem 118, and visualization subsystem 120.

Example Flowcharts

Figure 10A:
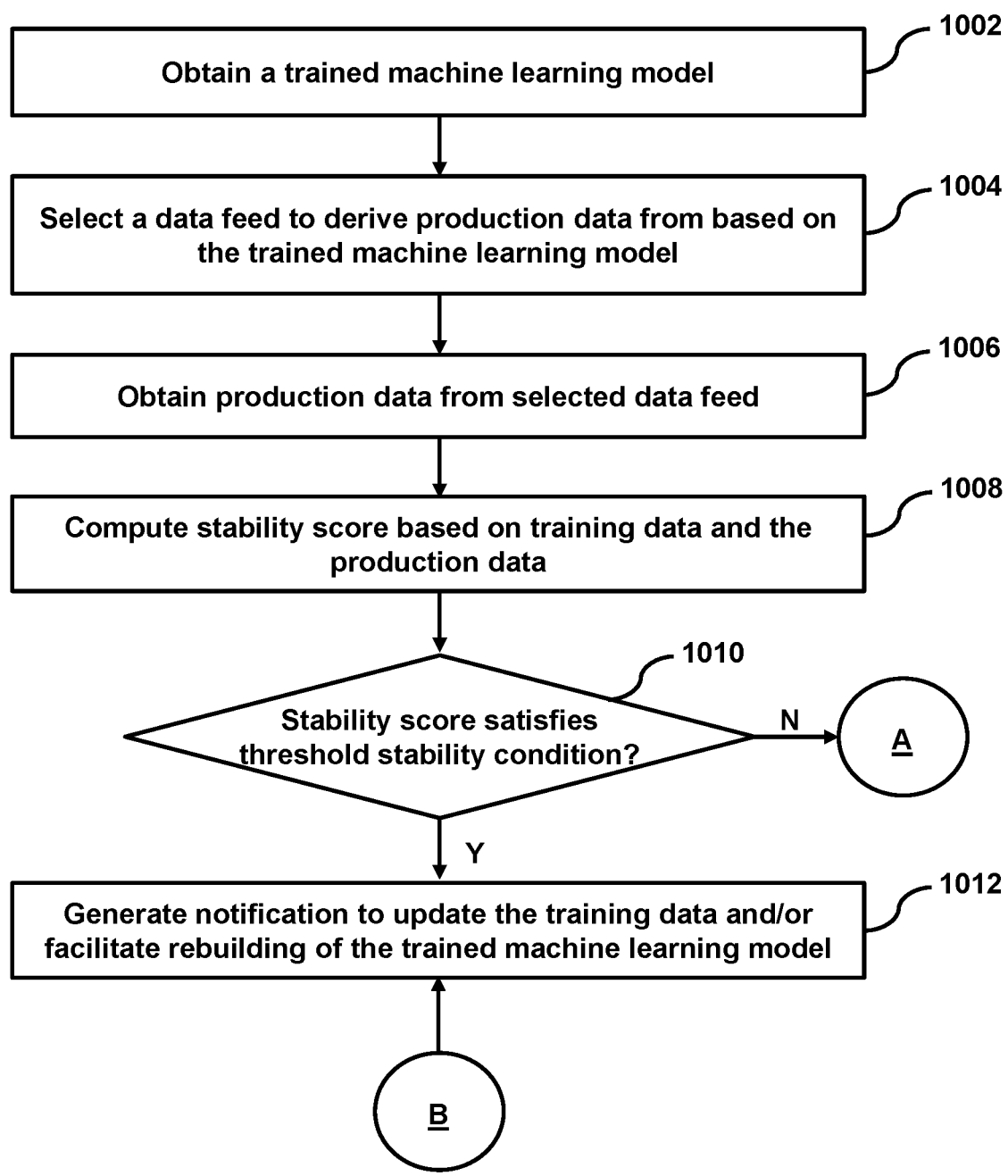
FIGS. 10A and 10B show flowcharts of a method for performing model monitoring, in accordance with one or more embodiments.
Figure 10B:
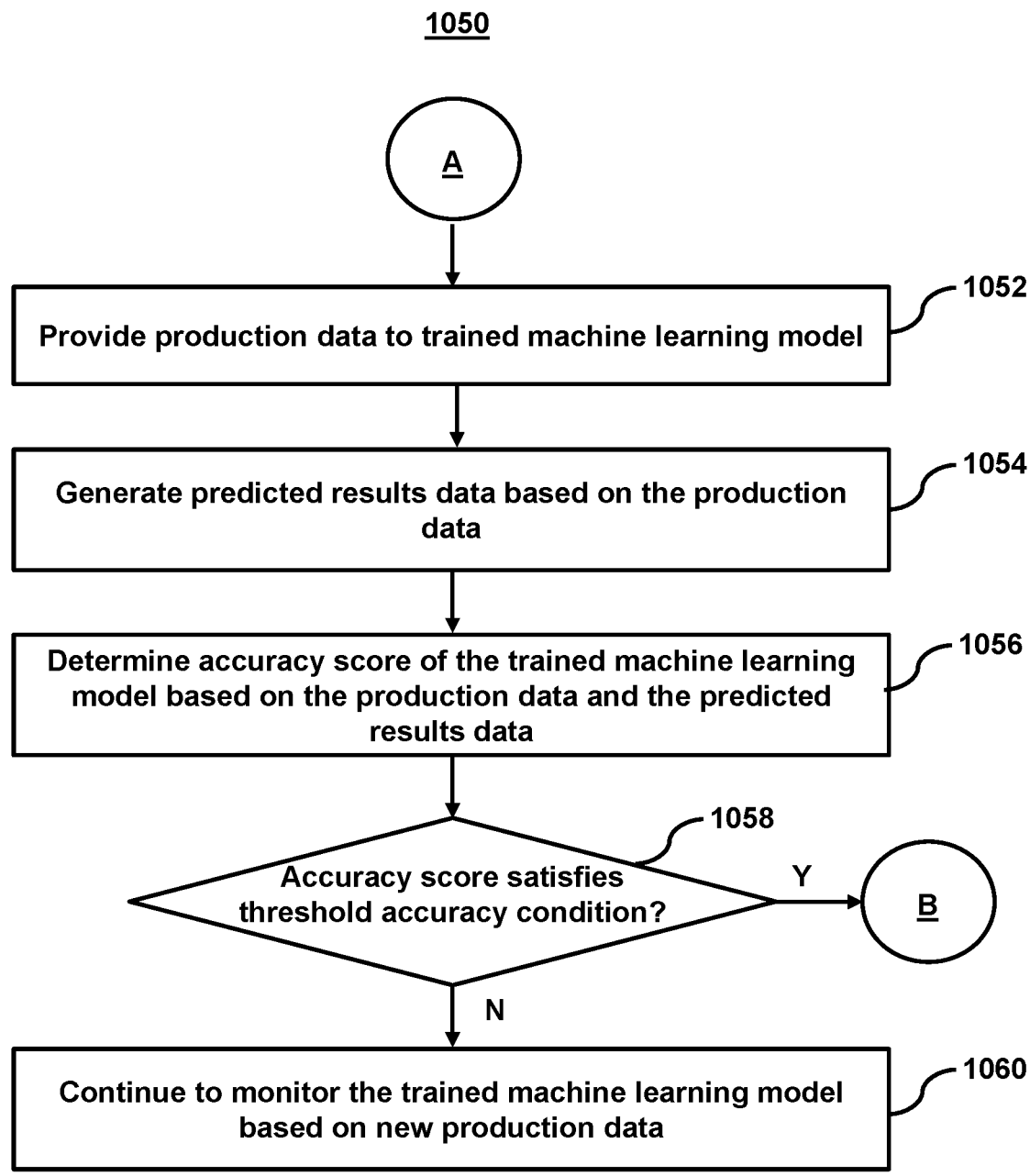

FIGS. 10A and 10B are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 10A shows a flowchart of a method 1000 for performing model monitoring, in accordance with one or more embodiments. In an operation 1002, a trained machine learning model may be obtained. In some embodiments, the trained machine learning model may be obtained from training subsystem 112 after having been trained. For example, trained machine learning model 210, upon being trained with training data (e.g., training data 214) and scored, may be stored by model database 134. Trained machine learning model 210 may then be retrieved for monitoring performance based on production data. In some embodiments, trained machine learning model 210 may be obtained along with configuration information 302. Configuration information 302 may include model identifier 312 associated with trained machine learning model 210, model input parameters 314 associated with trained machine learning model 210, and expected patterns 316 for model input parameters 314. In some embodiments, operation 1002 may be performed by a subsystem that is the same or similar to data processing subsystem 114.

In an operation 1004, a data feed may be selected from with which production data may be derived based on the trained machine learning model that was obtained. In some embodiments, the data feed may be selected based on the model identifier associated with the trained machine learning model that was obtained. For example, data feed 140a may be selected from data feeds 140a-140n based on model identifier 312 associated with trained machine learning model 210. Each of data feeds 140a-140n may be configured to receive updated application data 404a-404n from a corresponding one of real-time applications 402a-402n. Thus, the selected data feed may be used to obtain updated application data capable of being used to generate production data for input to the obtained trained machine learning model. In some embodiments, operation 1004 may be performed by a subsystem that is the same or similar to data processing subsystem 114.

In an operation 1006, production data may be obtained from the selected data. In some embodiments, obtaining the production data may include extracting feature sets and observed results corresponding to the feature sets from the updated application data of the selected data feed. The feature sets and observed results may be extracted based on the model input parameters included by the configuration information obtained with the trained machine learning model. For example, updated application data 502 may include feature sets 504a-504n and observed results 506a-506n. Based on model input parameters 314 included by configuration information 302, initial production data may be generated that includes feature sets 504a-504n and observed results 506a-506n. In some embodiments, initial production data may be generated based on the extracted feature sets and observed results. In some embodiments, one or more features or results of the initial production data may be masked based on the expected patterns included by the configuration information. For example, feature set 504a may include features F1-F3, however expected patterns 316 of configuration information 302 may indicate that feature F2 is to be masked. As another example, updated application data 502 includes feature set 504b and observed result 506b, however based on expected patterns 316 of configuration information 302, feature set 504b and observed result 506b may be masked. Production data 508 that is generated as a result of the extraction and masking may include feature sets 504a-504n (which may or may not include feature set 504b) and observed results 506a-506n (which may or may not include observed result 506b). Furthermore, production data 508 may include at least one masked feature (e.g., feature F2) and/or at least one masked result (e.g., observed result 506b). In some embodiments, operation 1006 may be performed by a subsystem that is the same or similar to data processing subsystem 114.

In an operation 1008, a stability score may be computed based on the training data and the production data. The training data may correspond to the training data used to train the trained machine learning model with which the production data is to be input to. The stability score may be used to determine whether the production data include a similar distribution of features and/or expected values for certain features. In some embodiments, a PSI value may be computed as the stability score based on training data 214 and production data 508. In some embodiments, operation 1008 may be performed by a subsystem that is the same or similar to model stability subsystem 118.

In an operation 1010, a determination may be made as to whether the stability score satisfies a threshold stability condition. In some embodiments, the threshold stability condition may be satisfied if a determination is made as that the stability score is less than a threshold stability score. For example, the threshold stability condition may be satisfied if a PSI value computed based on training data 214 and production data 508 is less than a threshold PSI value. The threshold PSI value may be 0.0, less than 0.001, less than 0.01, less than 0.1, or another value. In some embodiments, operation 1010 may be performed by a subsystem that is the same or similar to model stability subsystem 118.

If, at operation 1010, it is determined that the computed stability score satisfies the threshold stability condition, then method 1000 may proceed to an operation 1012. In operation 1012, a notification to update the training data and/or facilitate rebuilding of the trained machine learning model may be generated. For example, in response to determining that the computed stability score is less than the threshold stability score, user interface 800 including notification 802 may be generated indicating that trained machine learning model 210 is to be rebuilt and/or training data 214 used to train trained machine learning model 210 is to be updated. In some embodiments, operation 1012 may be performed by a subsystem that is the same or similar to model stability subsystem 118.

If, however, at operation 1010, it is determined that the computed stability score does not satisfy the threshold stability condition, then method 1000 may proceed to an operation 1052. As illustrated in FIG. 10B, a method 1050 for performing model monitoring, in accordance with one or more embodiments, may be described. In some embodiments, method 1050 may be a continuation of method 1000 described in FIG. 10A. In operation 1052, the production data may be provided to the trained machine learning model. For example, production data 508 may be provided, as input, to trained machine learning model 210. In some embodiments, production data 508 may be available for a limited amount of time. For example, production data 508 may not be stored persistently, or may be stored persistently subsequent to being provided as input to trained machine learning model 210. In some embodiments, operation 1052 may be performed by a subsystem that is the same or similar to model stability subsystem 118.

In an operation 1054, predicted results data may be generated based on the production data provided, as input, to the trained machine learning model. For example, production data 508 may be provided, as input, to trained machine learning model 210. Trained machine learning model 210 may generate predicted results data 602 based on production data 508. In some embodiments, predicted results data 602 may include predicted results 606a-606n. Predicted results 606a-606n may be generated based on feature sets 504a-504n of production data 508. In some embodiments, operation 1054 may be performed by a subsystem that is the same or similar to model stability subsystem 118.

In an operation 1056, an accuracy score of the trained machine learning model may be determined based on the production data and the predicted results data. In some embodiments, the accuracy score may indicate how well the trained machine learning model predicted results for the production data input to the trained machine learning model. As an example, differences between predicted results 606a-606n and observed results 506a-506n may be determined, respectively. In some embodiments, operation 1056 may be performed by a subsystem that is the same or similar to model stability subsystem 118.

In an operation 1058, a determination may be made as to whether the accuracy score satisfies a threshold accuracy condition. The threshold accuracy condition may be satisfied if the accuracy score determined for trained machine learning model 210 is less than a threshold accuracy score. In some embodiments, the threshold accuracy score may be determined based on an accuracy score of the trained machine learning model determined during model scoring process 208 from building the model. If the differences between predicted results 606a-606n and observed results 506a-506n is large, this may indicate that trained machine learning model 210 is unable to accurately predict results for real data that would be input to trained machine learning model 210 if deployed. In some embodiments, operation 1058 may be performed by a subsystem that is the same or similar to model stability subsystem 118.

If, at operation 1058, it is determined that the accuracy score does not satisfy the threshold accuracy condition, then method 1050 may proceed to an operation 1060. In operation 1060, the trained machine learning model may continued to be monitored for new or additional production data. For example, trained machine learning model 210 may continue to receive more updated application data from the selected data feed, which may be used to generate more production data that is input to trained machine learning model 210. In some embodiments, trained machine learning model 210 may be stored for deployment or deployed in response to determining that the accuracy score does not satisfy the threshold accuracy condition. If, however, at operation 1058, it is determined that the accuracy score satisfies the threshold accuracy condition, method 1050 may return to operation 1012.

In some embodiments, the various computers and subsystems illustrated in FIG. 1 may include one or more computing devices that are programmed to perform the functions described herein. The computing devices may include one or more electronic storages (e.g., database(s) 130, which may include training data database(s) 132, model database(s) 134, etc., or other electronic storages), one or more physical processors programmed with one or more computer program instructions, and/or other components. The computing devices may include communication lines or ports to enable the exchange of information with one or more networks (e.g., network(s) 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-116 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-116 described herein is for illustrative purposes, and is not intended to be limiting, as any of subsystems 112-116 may provide more or less functionality than is described. For example, one or more of subsystems 112-116 may be eliminated, and some or all of its functionality may be provided by other ones of subsystems 112-116. As another example, additional subsystems may be programmed to perform some or all of the functionality attributed herein to one of subsystems 112-116.

Although example embodiments have been described in detail for the purpose of illustration, it is to be understood that such detail is solely for that purpose and that embodiments are not limited to the disclosed embodiments, but, on the contrary, are intended to cover modifications and equivalent arrangements that are within the scope of the appended claims. For example, it is to be understood that embodiments contemplate that, to the extent possible, one or more features of any embodiment can be combined with one or more features of any other embodiment.

As used throughout this application, the word "may" is used in a permissive sense (i.e., meaning having the potential to), rather than the mandatory sense (i.e., meaning must). The words "comprise," "comprising," "comprises," "include", "including", and "includes" and the like mean including, but not limited to. As used throughout this application, the singular forms "a," "an," and "the" include plural referents unless the context clearly indicates otherwise, and notwithstanding the use of other terms and phrases for one or more elements, such as "one or more." The term "or" is non-exclusive (i.e., encompassing both "and" and "or"), unless the context clearly indicates otherwise. Further, unless otherwise indicated, statements that one value or action is "based on" another condition or value encompass both instances in which the condition or value is the sole factor and instances in which the condition or value is one factor among a plurality of factors. Unless the context clearly indicates otherwise, statements that "each" instance of some collection have some property should not be read to exclude cases where some otherwise identical or similar members of a larger collection do not have the property, i.e., each does not necessarily mean each and every.

Additional example embodiments are provided with reference to the following enumerated embodiments:

1. A method comprising: obtaining a machine learning model; obtaining production data; generating predicted results data based on the production data and the machine learning model; computing an accuracy score for the machine learning model based on the predicted results data; and determining whether the accuracy score satisfies a threshold accuracy condition.

2. The method of embodiment 1, wherein the production data is obtained from a data feed, the method further comprising: selecting the data feed based on the machine learning model.

3. The method of any one of embodiments 1-2, wherein the machine learning model comprises a trained machine learning model, the trained machine learning model being trained using training data.

4. The method of embodiment 3, further comprising: determining that the accuracy score satisfies the threshold accuracy condition; and, in response to determining that the accuracy score satisfies the threshold accuracy condition, causing the machine learning model to be rebuilt, the training data to be updated, or the machine learning model to be rebuilt and the training data to be updated.

5. The method of any one of embodiments 3-4, further comprising: determining a stability score for the trained machine learning model based on the training data and the production data; determining whether the stability score satisfies a threshold stability condition; and, in response to determining that the stability score satisfies the threshold stability condition, causing the machine learning model to be rebuilt, the training data to be updated, or the machine learning model to be rebuilt and the training data to be updated.

6. The method of embodiment 5, wherein the threshold stability condition being satisfied comprises the stability score being less than a threshold stability score.

7. The method of embodiment 6, wherein the stability score comprises a population stability index (PSI) value, and the threshold stability score comprises a PSI value of less than 0.1, less than 0.01, less than 0.001, 0.0, or less than 0.0.

8. The method of embodiment 6, wherein the stability score comprises a characteristic stability index (CSI) value, a principle component analysis (PCA) value, or a CSI value and a PCA value.

9. The method of any one of embodiments 1-8, further comprising: generating updated training data based on training data used to train the machine learning model in response to determining that the accuracy score satisfies the threshold accuracy condition or the stability score satisfies the threshold stability score.

10. The method of any one of embodiments 1-8, further comprising: causing the machine learning model to be rebuilt in response to determining that the accuracy score satisfies the threshold accuracy condition or the stability score satisfies the threshold stability score.

11. The method of any one of embodiments 2-10, wherein obtaining the production data comprises: extracting, from data output by the data feed, feature sets and observed results corresponding to the feature sets to generate first data; and masking, based on expected patterns of model input parameters of the machine learning model, one or more features or results of the first data to generate the production data, wherein (i) the production data comprise the feature sets and the observed results and (ii) at least one feature of the feature sets is a masked feature or at least one result of the observed results is a masked result.

12. The method of embodiment 11, wherein masking the one or more features or results of the first data comprises: applying a tag to the one or more features or results so as to cause the machine learning model to not generate a prediction for the corresponding one or more feature sets when the production data is input to the machine learning model; or removing the one or more features or results from the first data such that the production data does not include the one or more features or results.

13. The method of embodiment 11, further comprising: removing one or more feature sets and one or more observed results corresponding to the one or more feature sets such that the production data does not include the one or more feature sets and the one or more observed results.

14. The method of any one of embodiments 1-13, wherein obtaining the machine learning model comprises: selecting a type of machine learning model from a plurality of machine learning models, wherein the plurality of machine learning models comprise trained machine learning models; and retrieving, form a training subsystem, the machine learning model based on the type of machine learning model.

15. The method of embodiment 14, wherein the types of machine learning models include a machine learning model for approving or not approving a credit card application, a machine learning model for estimating a credit score, a machine learning model for determining an amount of credit to allocate to an individual, a machine learning model for autonomous driving, or a computer vision model.

16. The method of any one of embodiments 1-15, further comprising: obtaining configuration information associated with the machine learning model; and selecting the data feed from a plurality of data feeds based on the configuration information, wherein each data feed of the plurality of data feeds is configured to receive updated application data from one or more real-time applications.

17. The method of embodiment 16, wherein the configuration information associated with the machine learning model comprises: (i) a model identifier associated with the machine learning model, (ii) model input parameters associated with the machine learning model, and (iii) expected patterns for the model input parameters.

18. The method of embodiment 17, wherein the expected patterns for the model input parameters comprise a distribution of features included by the production data determined based on a distribution of features included by the training data.

19. The method of any one of embodiments 3-18, further comprising: determining a similarity score between the training data and the production data based on expected patterns of features represented by the training data and observed patterns of features represented within the production data; and in response to determining that the similarity score fails to satisfy a threshold similarity score condition, causing the machine learning model to be rebuilt, the training data to be updated, or the machine learning model to be rebuilt and the training data to be updated.

20. The method of any one of embodiments 1-19, further comprising: generating a notification indicating that the machine learning model is to be rebuilt or the training data is to be updated in response to determining that the accuracy score satisfies the threshold accuracy condition; and generating a user interface for displaying the notification.

21. The method of embodiment 20, further comprising: providing the user interface to a client device; and receiving, from the client device, an indication to cause the machine learning model to be rebuilt, the training data to be updated, or the machine learning model to be rebuilt and the training data to be updated.

22. The method of any one of embodiments 1-21, further comprising: computing a contribution of each feature represented by the production data to the accuracy score; and in response to determining that the contribution of any feature exceeds a threshold amount of contribution, causing the machine learning model to be rebuilt, the training data to be updated, or the machine learning model to be rebuilt and the training data to be updated.

23. One or more tangible, non-transitory, machine-readable media storing instructions that, when executed by one or more processors, effectuation operations comprising those of any of embodiments 1-22.

24. A system comprising: one or more processors; and memory storing computer program instructions that, when executed by the one or more processors, cause the one or more processors to effectuate operations comprising those of any of embodiments 1-22.

What is claimed is:

1. A system for rebuilding a currently-deployed machine learning model based on the currently-deployed machine learning model's accuracy calculated using production data derived from updated application data streaming from real-time applications, the system comprising:
    memory storing computer program instructions; and
    one or more processors that, in response to executing the computer program instructions, effectuate operations comprising:
        obtaining, from a training subsystem, a trained machine learning model and configuration information associated with the trained machine learning model, wherein the trained machine learning model is trained using training data comprising one or more first data sets, the configuration information comprising: (i) a model identifier associated with the trained machine learning model, (ii) model input parameters associated with the trained machine learning model, and (iii) expected patterns for the model input parameters;
        selecting, based on the model identifier, a data feed with which to derive production data to be provided as input to the trained machine learning model, the data feed being selected from a plurality of data feeds, each of the plurality of data feeds being configured to receive updated application data from one or more real-time applications;
        streaming, using the selected data feed, the updated application data;
        during the streaming of the updated application data, obtaining the production data from the selected data feed, wherein obtaining comprises:
            extracting, based on the model input parameters, feature sets and observed results corresponding to the feature sets from the updated application data of the selected data feed to generate initial production data, and masking, based on the expected patterns, one or more features or results of the initial production data such that (i) the production data comprises the feature sets and the observed results and (ii) at least one feature of the feature sets is a masked feature or at least one result of the observed results is a masked result;
        generating, with the trained machine learning model, predicted results data comprising predicted results based on the feature sets of the production data;
        determining an accuracy score of the trained machine learning model based on the predicted results of the predicted results data and the observed results of the production data; and
        in response to determining that the accuracy score is less than a threshold accuracy score, generating updated training data for re-building the trained machine learning model, the updated training data comprising one or more second data sets, and re-building the trained machine learning model using the updated training data.

2. The system of claim 1, wherein the operations further comprise:
    providing the updated training data and the model identifier to the training subsystem for re-building of the trained machine learning model.

3. The system of claim 1, wherein the expected patterns for the model input parameters comprise a distribution of features included within the training data, the operations further comprise:
    determining a population score index (PSI) value based on the training data and the production data, wherein the PSI value indicates a difference between the distribution of features included within the training data and an observed distribution of features included within the production data, wherein the updated training data is generated in response to determining that the PSI value is less than a threshold PSI value.

4. The system of claim 1, wherein the operations further comprise:
    determining residuals between predicted results of the predicted results data and observed results indicated in the production data, wherein the accuracy score is computed based on the residuals;
    determining a contribution to the residuals for each feature of a plurality of features represented by the production data; and
    in response to determining that the contribution to the residuals for any of the plurality of features is equal to or greater than a threshold amount of contribution for the residuals, causing the updated training data to be generated for re-building the trained machine learning model.

5. One or more non-transitory computer-readable media storing computer program instructions that, when executed by one or more processors, effectuate operations comprising:
    obtaining a trained machine learning model trained using training data;
    selecting, based on the trained machine learning model, a data feed to stream production data to input to the trained machine learning model;
    extracting, from data output from the data feed, feature sets and observed results corresponding to the feature sets to generate first data;
    masking, based on expected patterns of model input parameters of the trained machine learning model, one or more features or results of the first data to generate the production data, wherein (i) the production data comprise the feature sets and the observed results and (ii) at least one feature of the feature sets is a masked feature or at least one result of the observed results is a masked result; and
    during the streaming of the production data:
        generating, with the trained machine learning model, predicted results data based on the production data;
        determining an accuracy score for the trained machine learning model based on the predicted results data; and
        in response to determining that the accuracy score satisfies a threshold accuracy condition, causing updated training data to be generated to rebuild the trained machine learning model.

6. The one or more non-transitory computer-readable media of claim 5, wherein the operations further comprise:

determining a stability score for the trained machine learning model based on the training data and the production data, wherein causing the updated training data to be generated comprising determining that the stability score satisfies a threshold stability condition.

7. The one or more non-transitory computer-readable media of claim 5, wherein obtaining the trained machine learning model comprises:
selecting a type of trained machine learning model from a plurality of trained machine learning models; and
retrieving, from a training subsystem, the trained machine learning model based on the type of trained machine learning model.

8. The one or more non-transitory computer-readable media of claim 5, wherein the operations further comprise:
obtaining configuration information associated with the trained machine learning model wherein the data feed is selected from a plurality of data feeds based on the configuration information, wherein each data feed of the plurality of data feeds is configured to stream updated application data from one or more real-time applications, wherein the production data comprises the streamed updated application data.

9. The one or more non-transitory computer-readable media of claim 5, wherein the operations further comprise:
determining a similarity score between the training data and the production data based on expected patterns of features represented by the training data and observed patterns of features represented within the production data wherein the updated training data is caused to be generated to rebuild the trained machine learning model based on the similarity score failing to satisfy a threshold similarity score condition.

10. The one or more non-transitory computer-readable media of claim 5, wherein the operations further comprise:
generating a notification indicating that the trained machine learning model is to be rebuilt or the training data is to be updated in response to determining that the accuracy score satisfies the threshold accuracy condition; and
displaying the notification using a user interface.

11. The one or more non-transitory computer- readable media of claim 5, wherein the operations further comprise:
determining a contribution of each feature represented by the production data to the accuracy score, wherein the updated training data is caused to be generated to rebuild the trained machine learning model based on a determination that the contribution of any feature represented by the production data exceeds a threshold amount of contribution.

12. A method implemented by one or more processors executing one or more computer program instructions that, when executed, perform the method, the method comprising:
obtaining a trained machine learning model that is trained using training data;
selecting, based on the trained machine learning model, a data feed from which production data is streamed;
extracting, from data output from the data feed, feature sets and observed results corresponding to the feature sets to generate first data;
masking, based on expected patterns of model input parameters of the trained machine learning model, one or more features or results of the first data to generate the production data, wherein (i) the production data comprise the feature sets and the observed results and (ii) at least one feature of the feature sets is a masked feature or at least one result of the observed results is a masked result;
streaming the production data;
generating, during the streaming, with the trained machine learning model, predicted results data based on the production data;
determining, during the streaming, an accuracy score for the trained machine learning model based on the predicted results data;
determining that the accuracy score satisfies a threshold accuracy condition; and
causing updated training data to be generated to rebuild the trained machine learning model based on the accuracy score satisfying the threshold accuracy condition.

13. The method of claim 12, further comprising:
determining a stability score for the trained machine learning model based on the training data and the production data, wherein causing the updated training data to be generated comprising determining that the stability score satisfies a threshold stability condition.

14. The method of claim 12, wherein selecting the trained machine learning model comprises:
selecting a type of trained machine learning model from a plurality of trained machine learning models; and
retrieving, from a training subsystem, the trained machine learning model based on the type of trained machine learning model.

15. The method of claim 12, further comprising:
obtaining configuration information associated with the trained machine learning model wherein the data feed is selected from a plurality of data feeds based on the configuration information, wherein each data feed of the plurality of data feeds is configured to receive updated application data from one or more real-time applications, wherein the production data comprises the updated application data.

16. The method of claim 12, further comprising:
determining a similarity score between the training data and the production data based on expected patterns of features represented by the training data and observed patterns of features represented within the production data, wherein the updated training data is caused to be generated to rebuild the trained machine learning model based on the similarity score failing to satisfy a threshold similarity score condition.

17. The method of claim 12, further comprising:
generating a notification indicating that the trained machine learning model is to be rebuilt or the training data is to be updated in response to determining that the accuracy score satisfies the threshold accuracy condition; and
displaying the notification using a user interface.

18. The method of claim 12, further comprising:
determining a contribution of each feature represented by the production data to the accuracy score, wherein the updated training data is caused to be generated to rebuild the trained machine learning model based on a determination that the contribution of any feature represented by the production data exceeds a threshold amount of contribution.

* * * * *